US008741087B2

(12) United States Patent
Rarama et al.

(10) Patent No.: US 8,741,087 B2
(45) Date of Patent: Jun. 3, 2014

(54) MEDIA APPLICATION

(75) Inventors: Jeremias Rarama, Surrey (CA); Yuri Zavorotny, New Westminister (CA); Darcy T. Montgomery, Burnaby (CA)

(73) Assignee: Kodak Graphic Communications Canada Company, Burnaby (CA)

(*) Notice: Subject to any disclaimer, the term of this patent is extended or adjusted under 35 U.S.C. 154(b) by 543 days.

(21) Appl. No.: 13/132,082

(22) PCT Filed: Dec. 5, 2008

(86) PCT No.: PCT/IB2008/003384
§ 371 (c)(1),
(2), (4) Date: Jun. 1, 2011

(87) PCT Pub. No.: WO2010/064073
PCT Pub. Date: Jun. 10, 2010

(65) Prior Publication Data
US 2011/0232834 A1    Sep. 29, 2011

(51) Int. Cl.
*B41J 11/04* (2006.01)
*B41M 5/025* (2006.01)
*B65H 23/00* (2006.01)
*B29C 65/14* (2006.01)
*B65C 9/04* (2006.01)
*B29C 65/48* (2006.01)

(52) U.S. Cl.
USPC ........... 156/240; 156/230; 156/239; 156/277; 156/384; 156/443; 156/446; 156/448

(58) Field of Classification Search
USPC ........ 156/230, 277, 239, 240, 443, 446–450, 156/458, 384
See application file for complete search history.

(56) References Cited

U.S. PATENT DOCUMENTS

| 5,268,708 A | * | 12/1993 | Harshbarger et al. | 346/134 |
| 6,843,875 B2 | * | 1/2005 | Kerr | 156/230 |
| 2009/0288760 A1 | * | 11/2009 | Garben | 156/230 |

FOREIGN PATENT DOCUMENTS

| EP | 461467 | 12/1991 |
| JP | 56-108654 | 8/1981 |
| WO | 2009/127888 | 10/2009 |
| WO | WO 2010064073 A2 * | 6/2010 |

* cited by examiner

Primary Examiner — Sonya Mazumdar
(74) Attorney, Agent, or Firm — Nelson Adrian Blish

(57) ABSTRACT

A method and apparatus are provided which include providing a rotatable roller with a cylindrical surface adapted to wrap the donor element on the surface. A donor element is secured to the roller and a first portion of the donor element is wrapped onto the cylindrical surface while applying tension to the media. The tension is then decreased to alter a region of contact between the first portion of the donor element and the cylindrical surface. An additional portion of the donor element is then wrapped onto the cylindrical surface. The donor element is then transferred from the roller to a substrate.

34 Claims, 14 Drawing Sheets

MEDIA APPLICATION

CROSS REFERENCE TO RELATED APPLICATIONS

This is a U.S. National Stage application under 35 U.S.C. 371 of International Application No. PCT/IB2008/003384, filed Dec. 5, 2008.

FIELD OF THE INVENTION

This invention relates to methods and apparatus for applying media to a cylindrical roller. The cylindrical roller can be adapted to convey the media along a conveying path. A cylindrical roller assembly in accordance with the present invention is especially useful in imaging systems, particularly when media incorporating donor material are exposed to transfer donor material onto a surface, and after exposure, are removed from the surface.

BACKGROUND OF THE INVENTION

Color flat panel displays, such as liquid crystal displays and the like, typically incorporate color filters used to provide pixels with color. One technique for fabricating color filters involves a laser-induced thermal transfer process. A particular prior art thermal transfer process is illustrated schematically in FIG. 1. A substrate 10, known in the art as a receiver element, is overlaid with a donor element 12, known in the art as a donor sheet. Donor element 12 typically incorporates a support layer 12A and a transfer layer 12B. Transfer layer 12B can include various transferable donor materials including colorants, pigments, or the like. Support layer 12A is typically made of plastic.

Donor element 12 is image-wise exposed to cause selected portions of transfer layer 12B to be transferred from support layer 12A to a surface of substrate 10. Some exposure methods employ one or more controllable lasers 14 to provide one or more corresponding laser beams 16 to induce the transfer of donor material from the imaged regions of donor element 12 to corresponding regions of substrate 10. Controllable laser(s) 14 may comprise diode laser(s) which are relatively easy to modulate, are relatively low cost, and are relatively small in size. Such laser(s) 14 are controllable to directly expose donor element 12. In some applications, masks (not shown) are used in exposing various media.

In some imaging applications, a number of different donor elements 12 are sequentially applied to substrate 10, imaged and then removed. For example, during typical fabrication of color filters, a first donor element 12 is used to apply one color, such as a red donor material to substrate 10, and the first donor element is then removed; a second donor element 12 is used to apply, for example, green donor material, and the second donor element is then removed; a third donor element 12 is used to apply, for example, blue donor material, and the third donor element is then removed.

Media loaders employing various cylindrical supports such as rollers and the like are typically employed to apply and/or remove flexible media such as donor element 12 to, or from various surfaces. The various rollers are employed in various operations which include but are not limited to: transferring and loading of media into the loader; application of media onto a surface; and removal of media from the surface after it has undergone a processing step (e.g. exposure). In some processes, the media is stored on media rolls and a web of the media is transferred from a media roll to a roller of the media loader during a loading operation. The loading operation can involve separating the media web into sheets of media. Wrinkles in the media can arise for various reasons. For example, mis-alignment between the media roll and the roller can lead to a non-uniform web tension which can cause wrinkles to form during loading. The difficulties associated with the loading operation can be further compounded when media is loaded from a plurality of media rolls (e.g. different colored donor elements) and each of the media rolls has a different orientation with respect to the roller sufficient to alter the web tension between the different loadings.

Exposure processes such as thermal transfer processes are typically sensitive to the uniformity of the interface between the applied donor element 12 and a substrate 10. Entrapped bubbles, wrinkles and the like can cause variances in the amount of donor material that is transferred to substrate 10 which can lead to various undesired image artifacts. Media that has been loaded into the media loader typically needs to be applied to substrate 10 such that a uniform interface free of wrinkles, bubbles, etc is created between the donor element 12 and substrate 10. Donor element 12 can be mounted onto the surface of a roller of the media loader (e.g. an application roller), and the roller can then be operated to apply the mounted donor element 12 to substrate 10. Mounted donor element 12 can be applied to substrate 10 by rolling the donor element 12 onto substrate 10. The present inventors have observed that if wrinkles or bubbles are entrapped between the donor element 12 and the application roller during the initial application of donor element 12 onto the application roller, entrapped wrinkles or bubbles are also likely to occur between the donor element 12 and substrate 10 during a subsequent application of donor element 12 to substrate 10. The present inventors have observed that wrinkles or bubbles are especially likely to occur if donor elements 12 with reduced calipers or thicknesses are employed.

There is need in the art for an imaging device that includes a media loader having an application roller onto which media can be loaded onto a surface thereof with reduced occurrences of entrapped wrinkles or bubbles.

There is need in the art for a thermal transfer imaging device that includes a media loader having an application roller onto which thermal transfer donor media can be loaded onto a surface thereof with reduced occurrences of entrapped wrinkles or bubbles.

There is a need in the art for a thermal transfer imaging device that includes a media loader having an application roller onto which thermal transfer donor media of reduced thicknesses can be loaded onto a surface thereof with reduced occurrences of entrapped wrinkles or bubbles.

SUMMARY OF THE INVENTION

The present invention relates to a method for forming an image on media. The image can include one or more patterns of features, such as color features for a color filter or colored illumination sources as part of an organic light emitting diode display. The images can be formed by a laser-induced thermal transfer process such as a laser-induced dye-transfer process, a laser induced mass transfer process or by other means of transferring material from a donor element to a receiver element. In such processes, a donor media or donor element can be applied to and removed from a receiver. The donor element has a support layer which could be less than 2 mils (50.8 mm), or even less than 1 mil (25.4 mm) thick. The donor element has a transfer layer.

The method can include providing a rotatable roller with a cylindrical surface adapted to wrap the donor element on the surface. A first end of the donor element is secured to the roller and a first portion of the donor element is wrapped onto the cylindrical surface while applying tension to the media to establish a region of contact between the first portion of the donor element and the cylindrical surface. The tension is then decreased to alter the region of contact between the first portion of the donor element and the cylindrical surface. An additional portion of the donor element is then wrapped onto the cylindrical surface after the region of contact between the first portion of the donor element and the cylindrical surface has been altered. The donor element is transferred from the roller to a substrate. The donor element is then exposed to radiation to transfer a portion of the transfer layer from the donor element to the substrate.

In one embodiment, a second portion of the donor element is unwrapped from the cylindrical surface before wrapping the additional portion of the donor element onto the cylindrical surface. The second portion can be unwrapped while decreasing the applied tension. The applied tension can be decreased by rotating the roller, or by translating the roller. The size of the region of contact can be increased as the additional portion, which can include the second portion of the donor element, is wrapped onto the cylindrical surface.

In one embodiment, at least one nip can be operated to nip the donor element while wrapping the first portion of the donor element onto the cylindrical surface. The at least one nip member can cease nipping or not nip the donor element prior to decreasing the applied tension and can cease nipping or not nip the donor element while unwrapping the second portion of the donor element from the cylindrical surface. The nip member can be positioned to nip the donor element at a location between the donor element roll and the roller. A portion of the donor element can be separated from the donor element assembled on the donor element roll. This separated portion can be sized to wrap over the surface of the roller without overlapping itself.

In one embodiment, the cylindrical surface is contacted by a portion of media that is conformed to the cylindrical surface, and a portion of the media is separated from the cylindrical surface before an additional portion of the media is wrapped onto the cylindrical surface. The portion of the media substantially maintains its conformed shape when the portion of the media is separated from the cylindrical surface.

An apparatus is provided, in one embodiment, for applying media to a cylindrical roller. The cylindrical roller has a cylindrical surface which could be a partial or complete cylinder. The roller is adapted to wrap the donor media on it. A carriage is movably mounted on a support and is operable for conveying the roller along a path. A controller, which could include a plurality of controllers, causes the roller to rotate to wrap a first portion of the donor element onto the cylindrical surface while applying tension to the donor element to establish a region of contact between the first portion of the donor element and the cylindrical surface. The controller or controllers cause the roller to rotate while decreasing the applied tension to alter the region of contact between the first portion of the donor element and the cylindrical surface. The controller or controllers then cause the roller to rotate to wrap an additional portion of the donor element onto the cylindrical surface after the region of contact between the first portion of the donor element and the cylindrical surface has been altered. The carriage is then caused to operate to move the roller along the path while transferring the first portion of the donor element and the additional portion of the donor element from the cylindrical surface to a substrate.

In one embodiment, the controller is programmed to cause the roller to translate while decreasing the applied tension. The controller can also be programmed to cause the roller to rotate while decreasing the applied tension. The apparatus can include at least one nip member adapted to selectively nip the donor element at a location between a media roll and the roller and can also include a cutter adapted to separate the donor element at a location between the media roll and the roller.

BRIEF DESCRIPTION OF THE DRAWINGS

The present invention will now be described, by way of example, with reference to the accompanying drawings, in which.

DETAILED DESCRIPTION OF THE INVENTION

Figure 1:
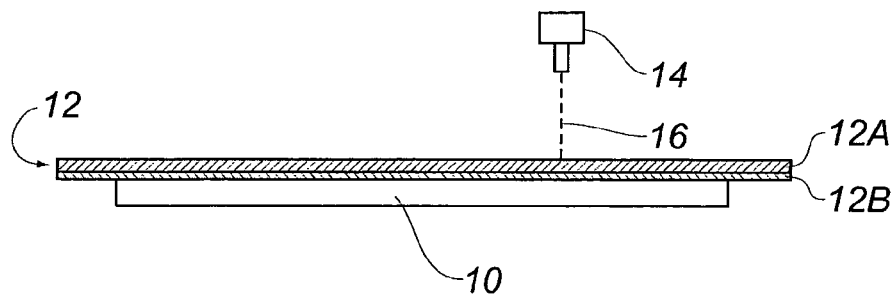
FIG. 1 schematically illustrates a prior art thermal transfer imaging process used to transfer donor material from a donor element to a substrate.

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded as illustrative rather than restrictive. It is to be further noted that the drawings are not to scale.

FIGS. 2A, 2B, 2C, 2D, 2E, 2F, 2G, 2H, 2I, 2J, 2K, 2L, 2M and 2N schematically depict various parts of apparatus 102 and methods of operation thereof according to an example embodiment of the invention. In this example embodiment of the invention, various thermal transfer donor elements 112, 114 and 116 are assembled on respective media rolls 113, 115 and 117. Each of the donor elements 112, 114 and 116 includes a support layer and a transfer layer. In this illustrated embodiment, each of the donor elements 112, 114 and 116 are media that correspond to a given color. Each of the donor elements 112, 114 and 116 undergoes a corresponding process that involves transferring a portion of the donor element to media loader 124; applying the donor element portion to a surface of substrate 110; imaging the donor element portion in a thermal transfer exposure process; and removing the spent donor element portion from substrate 110.

Figure 2A:
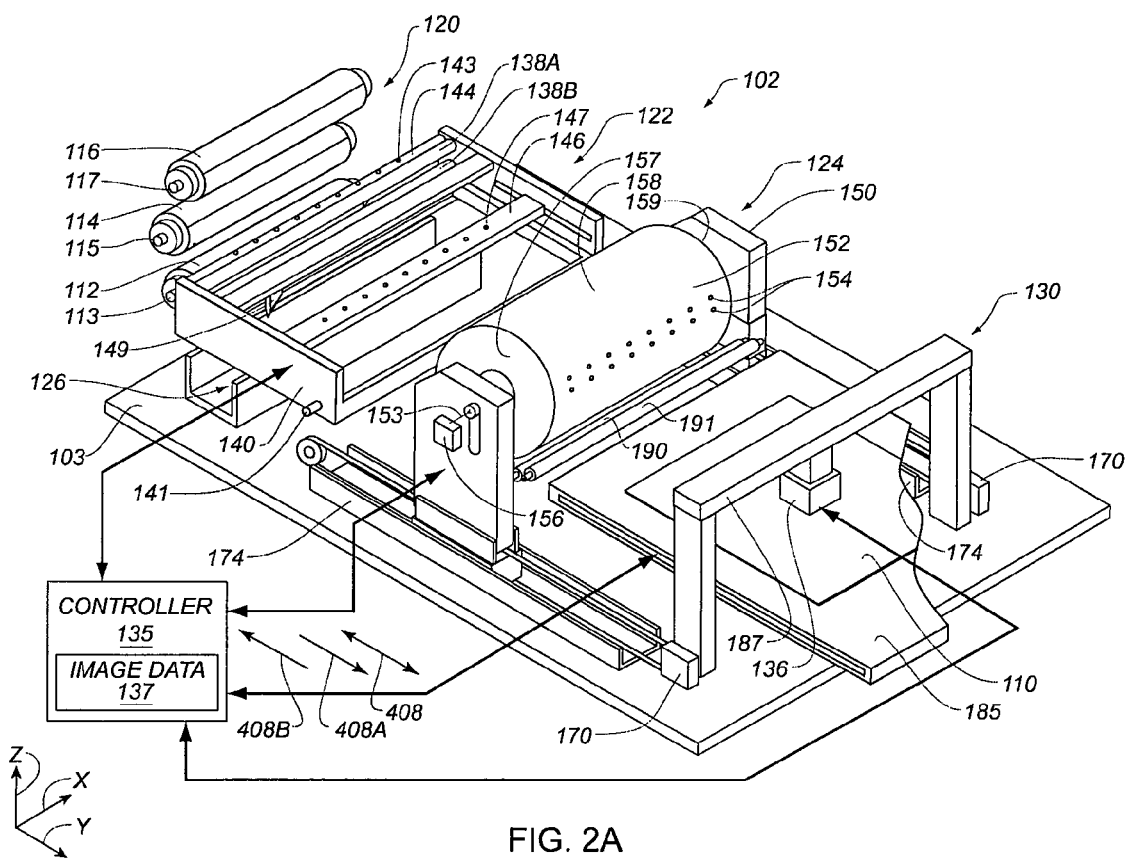
FIG. 2A schematically illustrates an apparatus as per an example embodiment of the invention.

As schematically depicted in FIG. 2A, apparatus 102 includes various sub-systems which include a media supply 120, a media feed system 122, a media apply/peel system 124

(also referred to as media loader 124), disposal system 126 and exposure system 130. These various sub-systems are positioned on support 103. Media roll supply 120 stores media rolls 113, 115 and 117. In this example embodiment, media rolls 113, 115 and 117 are donor element rolls onto which corresponding donor elements 112, 114 and 116 are assembled. A selected one of the donor elements 112, 114 and 116 can be provided to media feed system 122. The media feed system 122 secures, separates and guides portions of the selected donor element to media loader 124. Media loader 124 applies the selected donor element to substrate 110 positioned within exposure system 130. Upon completion of the exposure or imaging of the media assemblage within exposure system 130, media loader 124 removes the imaged donor element from substrate 110 and transports the donor element to disposal system 126. These various steps can be additionally performed with other donor elements selected from media rolls 113, 115 and 117. For convenience, coordinate X, Y and Z reference frame will be referred to describe various operations of apparatus 102.

Controller 135, which can include one or more controllers, is programmed to control one or more systems of apparatus 102 including, but not limited to, media supply 120 (control signal not shown), media feed system 122, media loader 124 and exposure system 130. Controller 135 can also control media handling mechanisms (not shown) that can initiate the loading and/or unloading of substrates 110 to and/or from exposure system 130. Controller 135 can also provide image data 137 to exposure head 136 and control exposure head 136 to emit radiation beams in accordance with this data. Various systems can be controlled using various control signals and/or implementing various methods. Controller 135 can be configured to execute suitable software and can include one or more data processors, together with suitable hardware, including by way of non-limiting example: accessible memory, logic circuitry, drivers, amplifiers, A/D and D/A converters, input/output ports and the like. Controller 135 can comprise, without limitation, a microprocessor, a computer-on-a-chip, the CPU of a computer or any other suitable microcontroller.

Figure 2B:
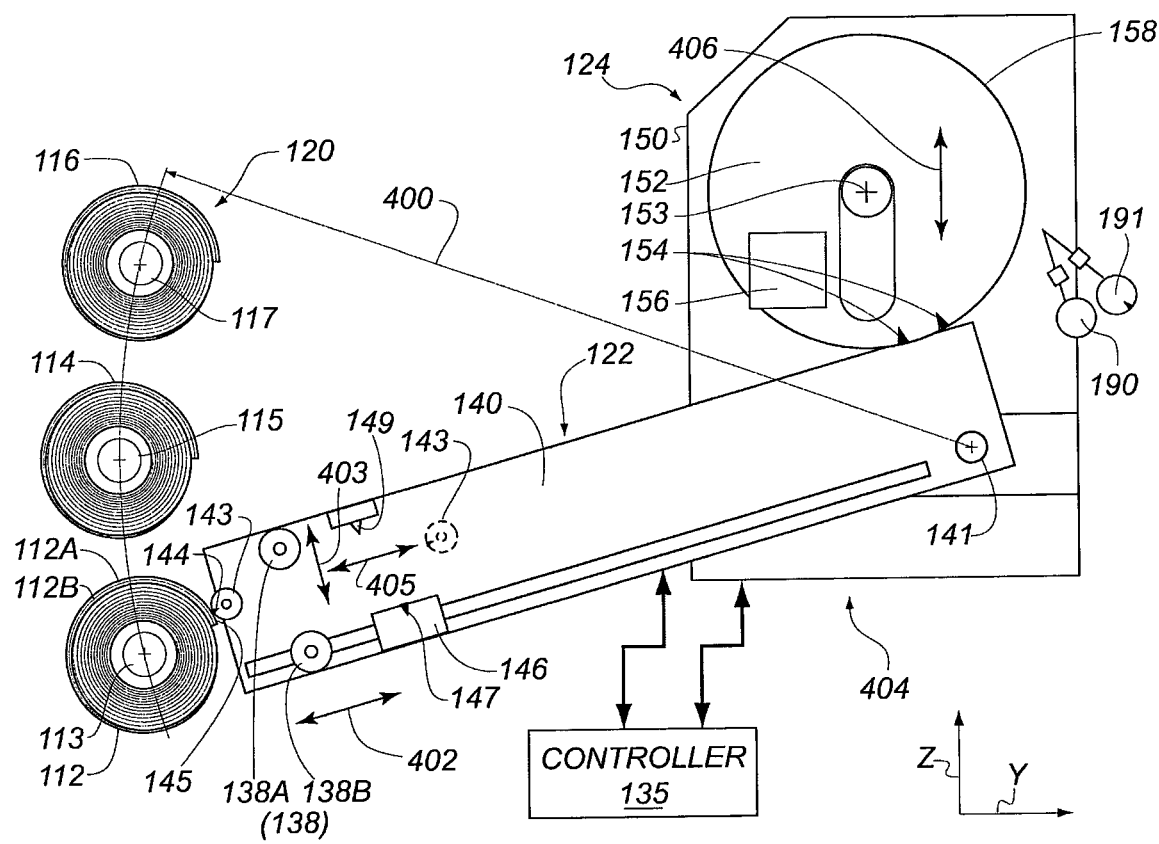
FIGS. 2B, 2C, 2D, 2E, 2F, 2G, 2H and 2I schematically show a part of the apparatus of FIG. 2A and a method of use thereof to transfer and mount a donor element portion from a media roll onto an application roller as per an example embodiment of the invention.
Figure 2C:
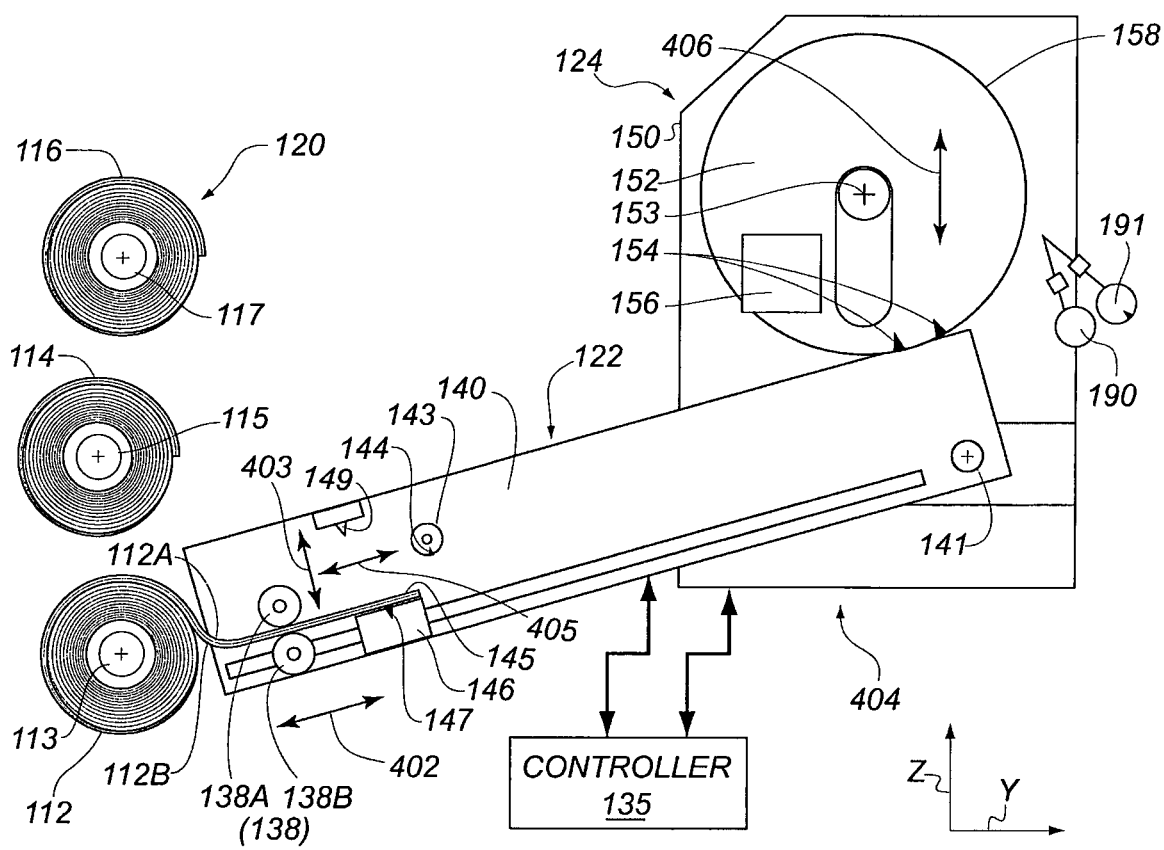
Figure 2D:
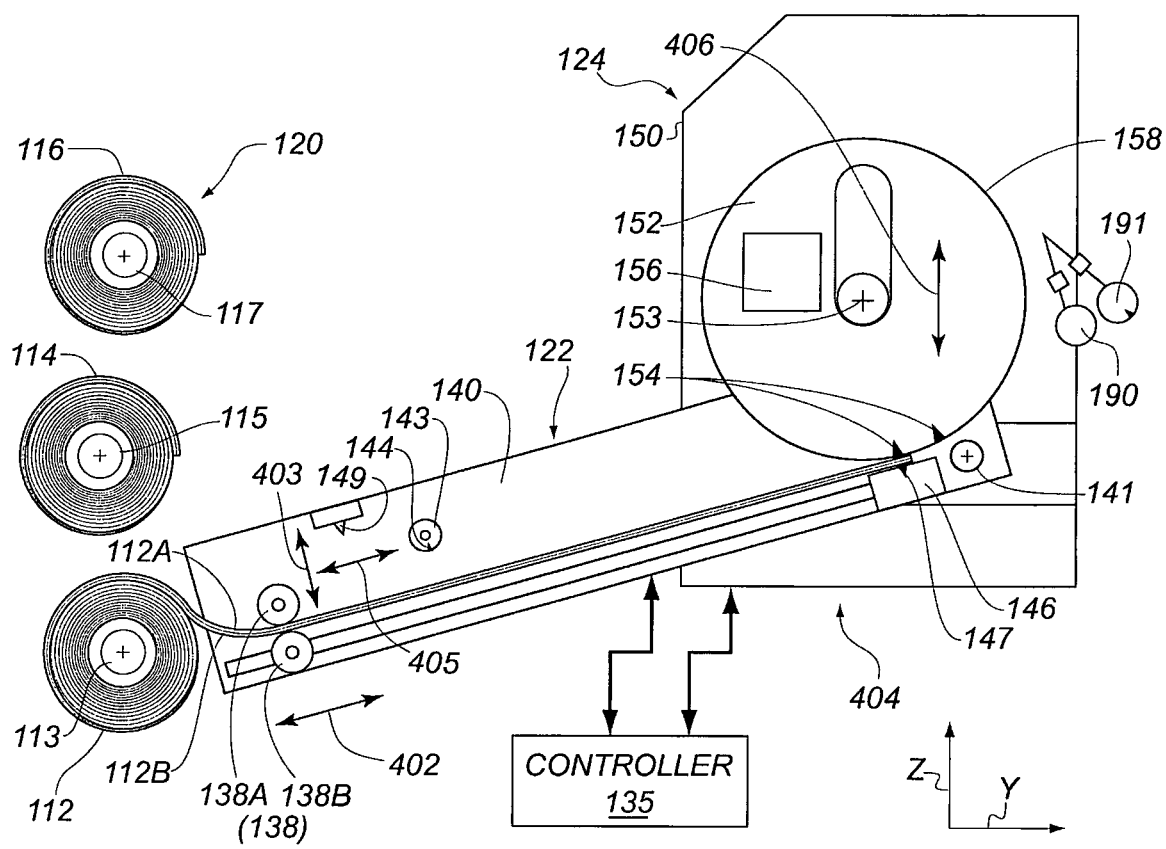
Figure 2E:
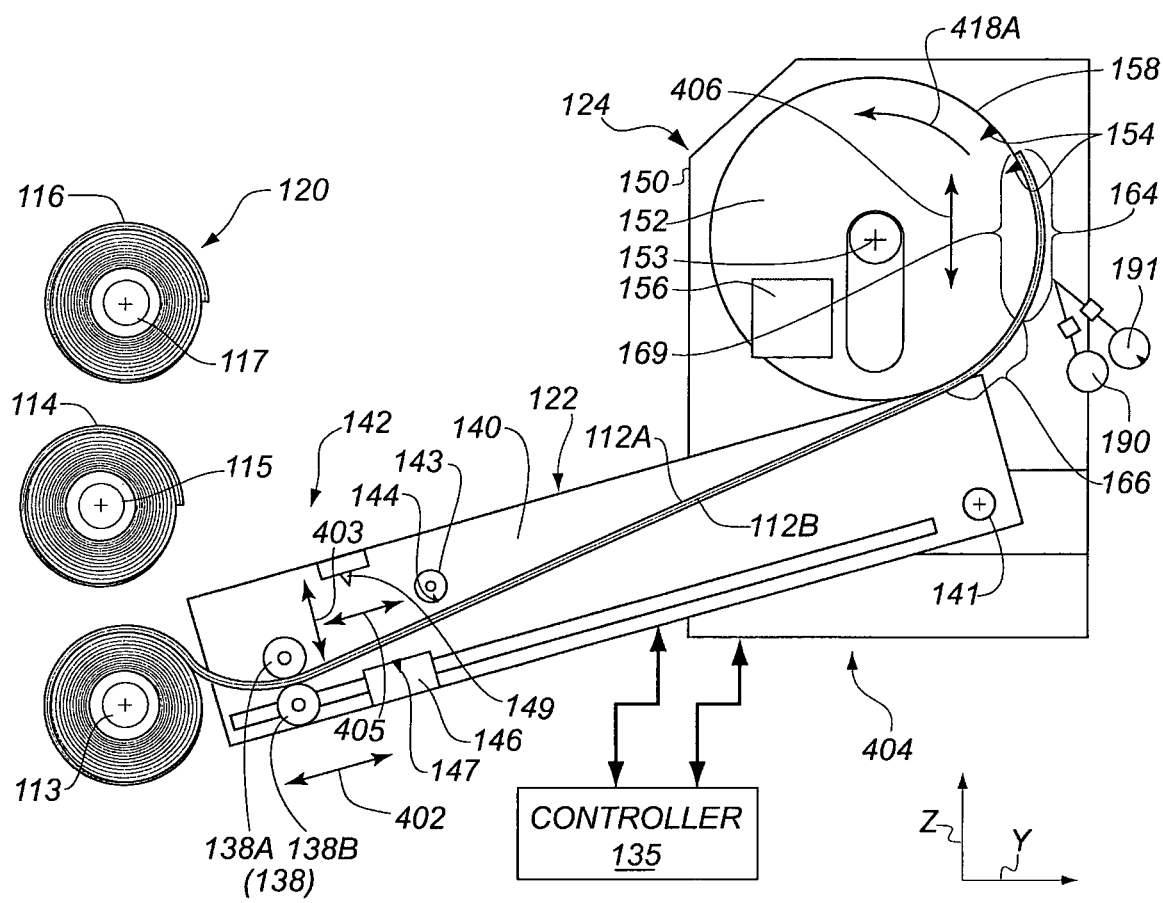
Figure 2F:
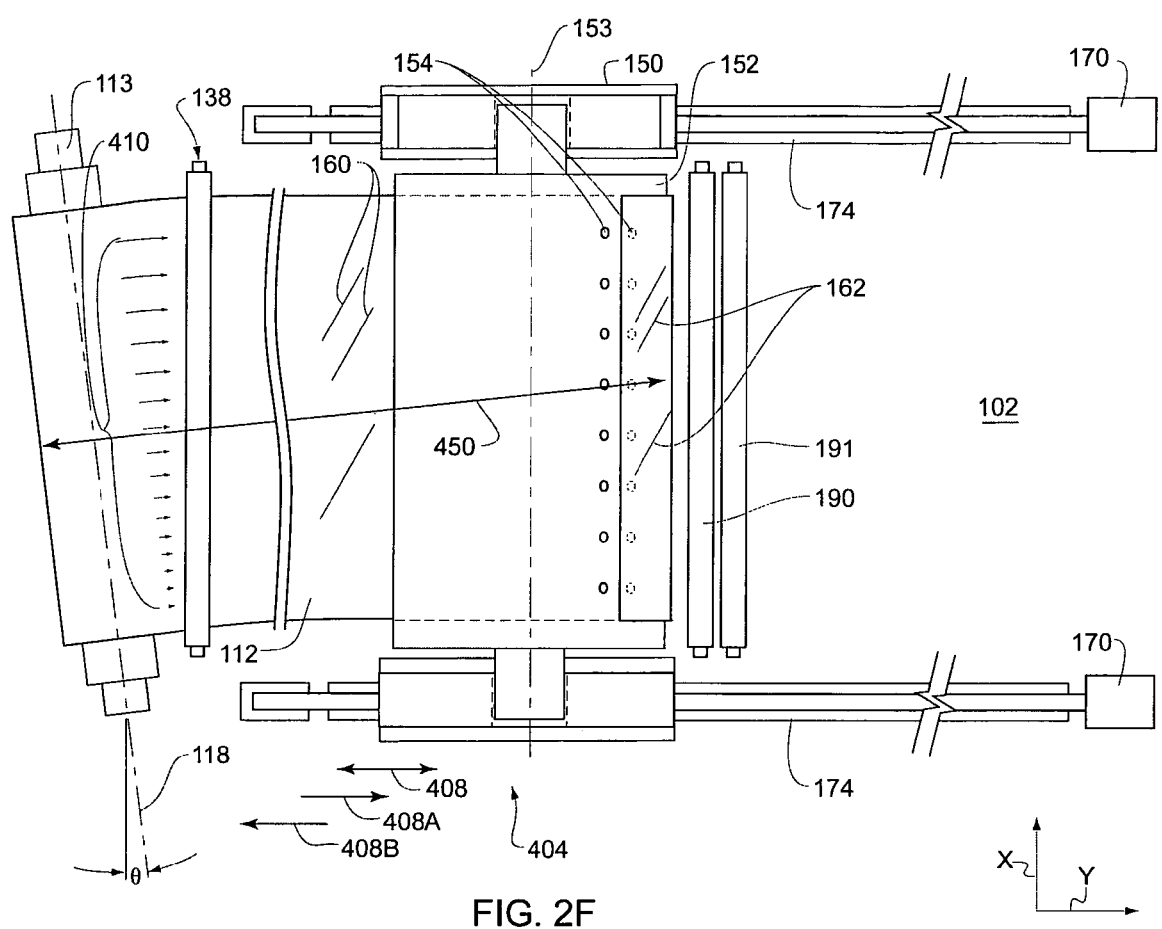
Figure 2G:
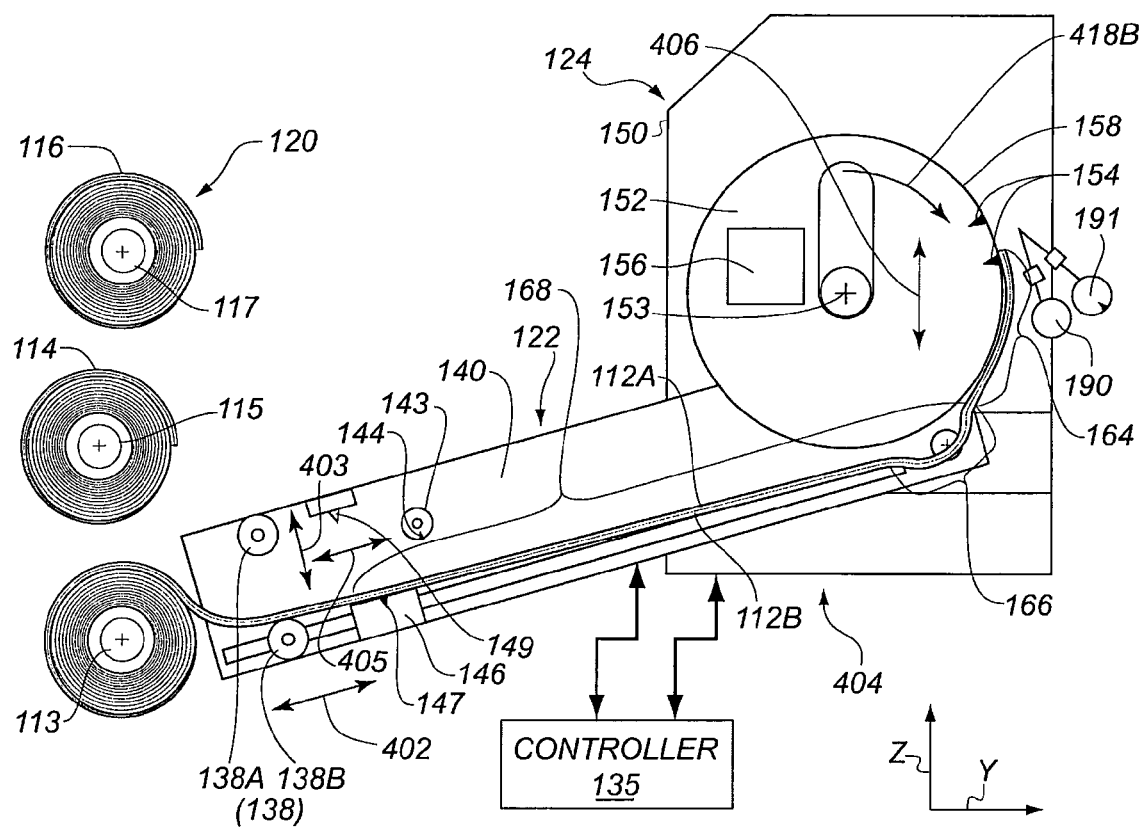
Figure 2H:
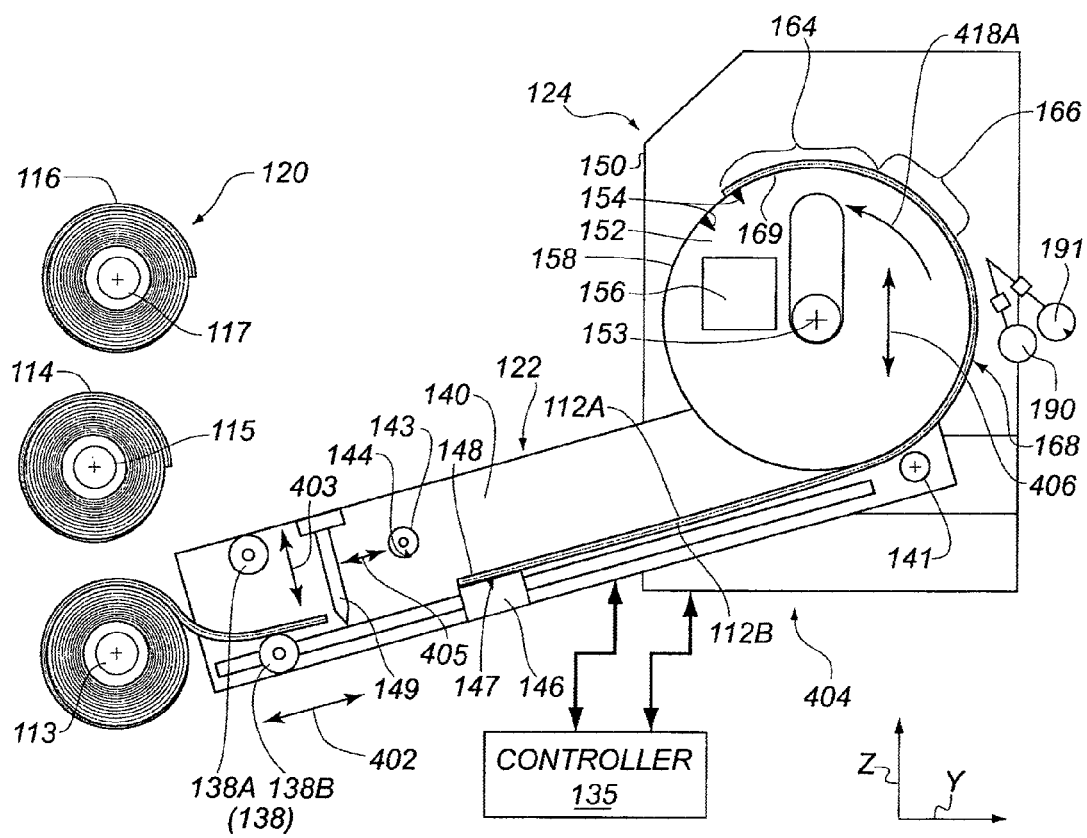
Figure 2I:
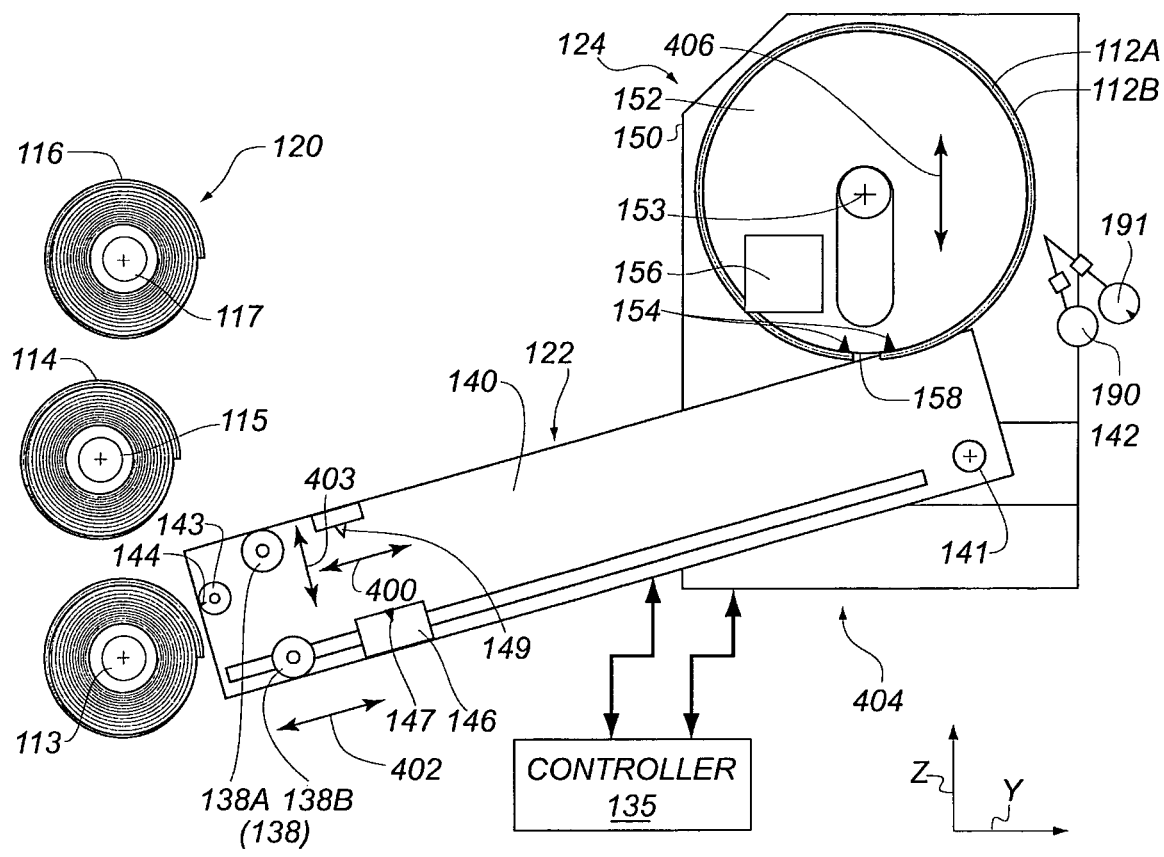
Figure 2J:
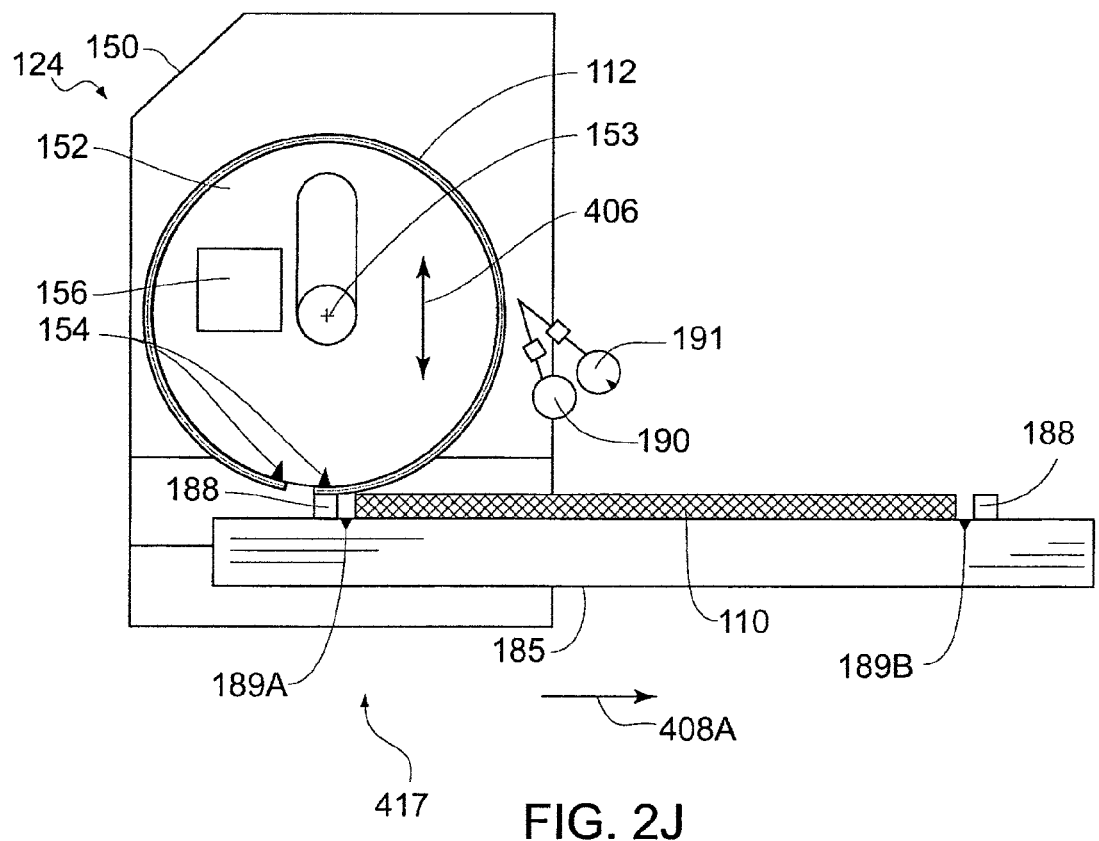
FIG. 2J schematically shows the application of a mounted donor element onto a substrate by the application roller the apparatus of FIG. 2A as per an example embodiment of the invention.
Figure 2K:
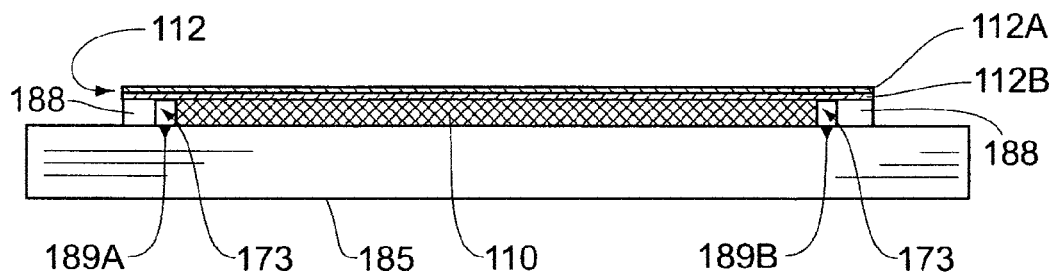
FIG. 2K schematically shows a cross-sectional view of a donor element on a substrate.
Figure 2L:
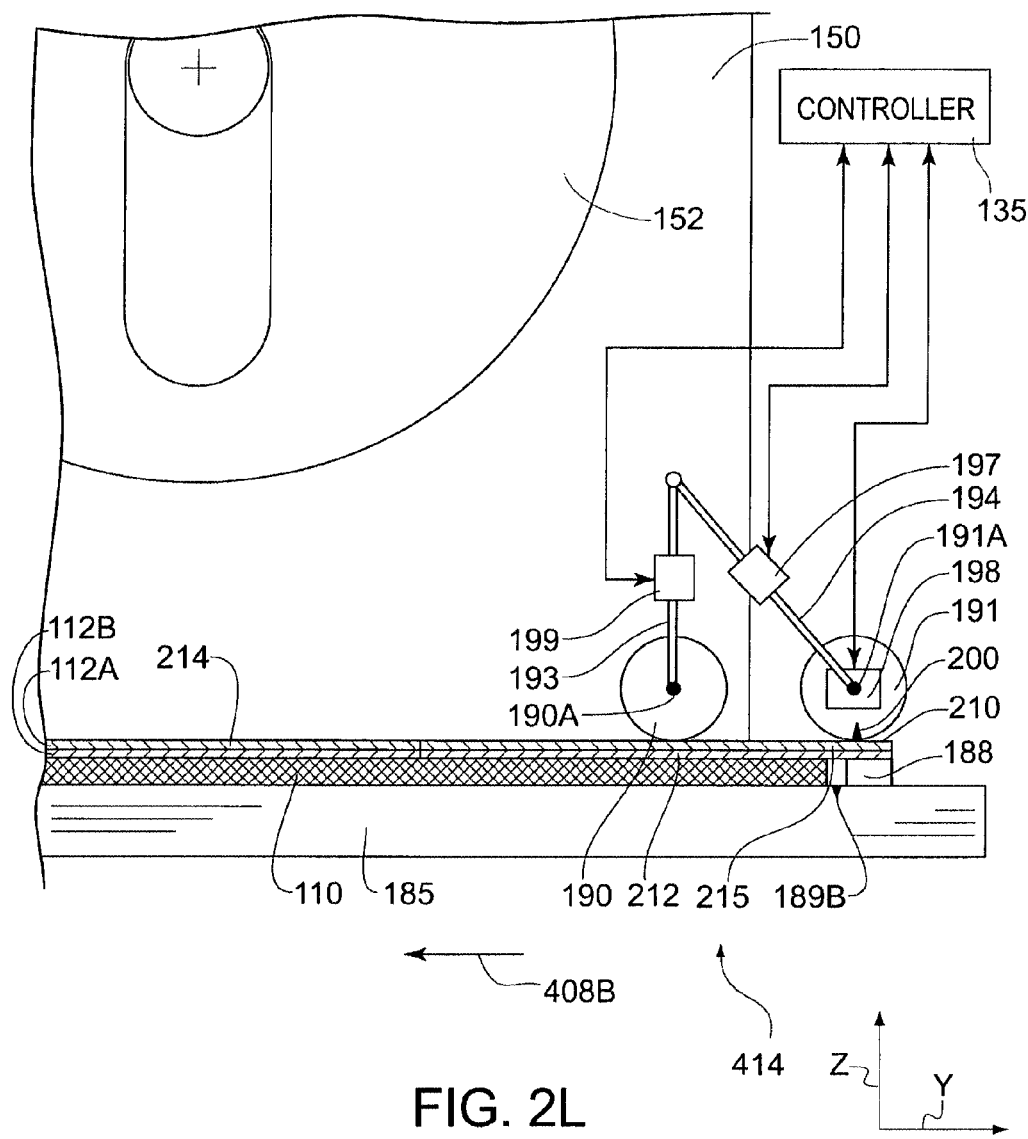
FIGS. 2L, 2M and 2N schematically show a portion of the apparatus of FIG. 2A and a method of use thereof to remove a donor element from a substrate with a peel roller and a take-up roller as per an example embodiment of the invention.
Figure 2M:
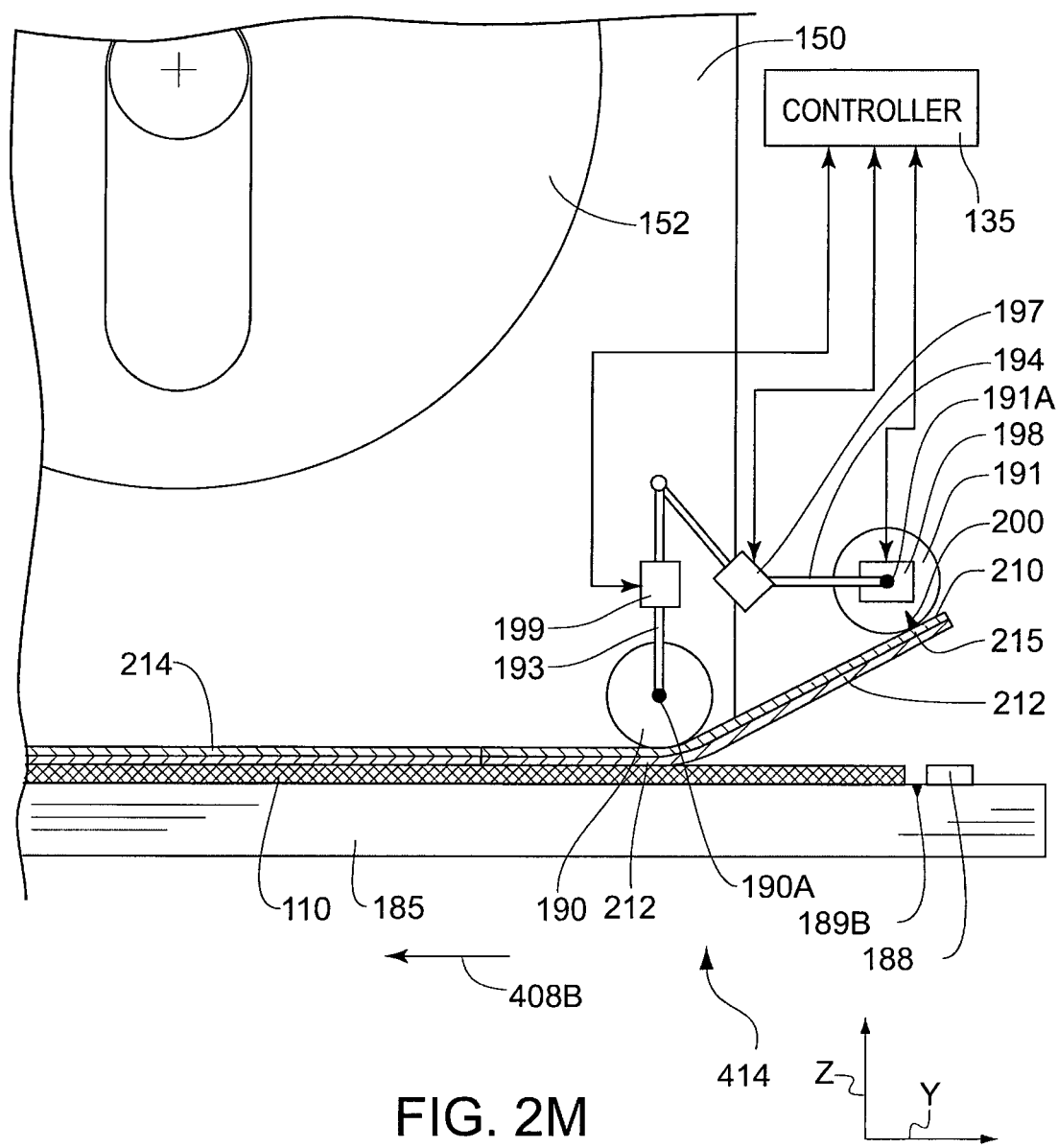
Figure 2N:
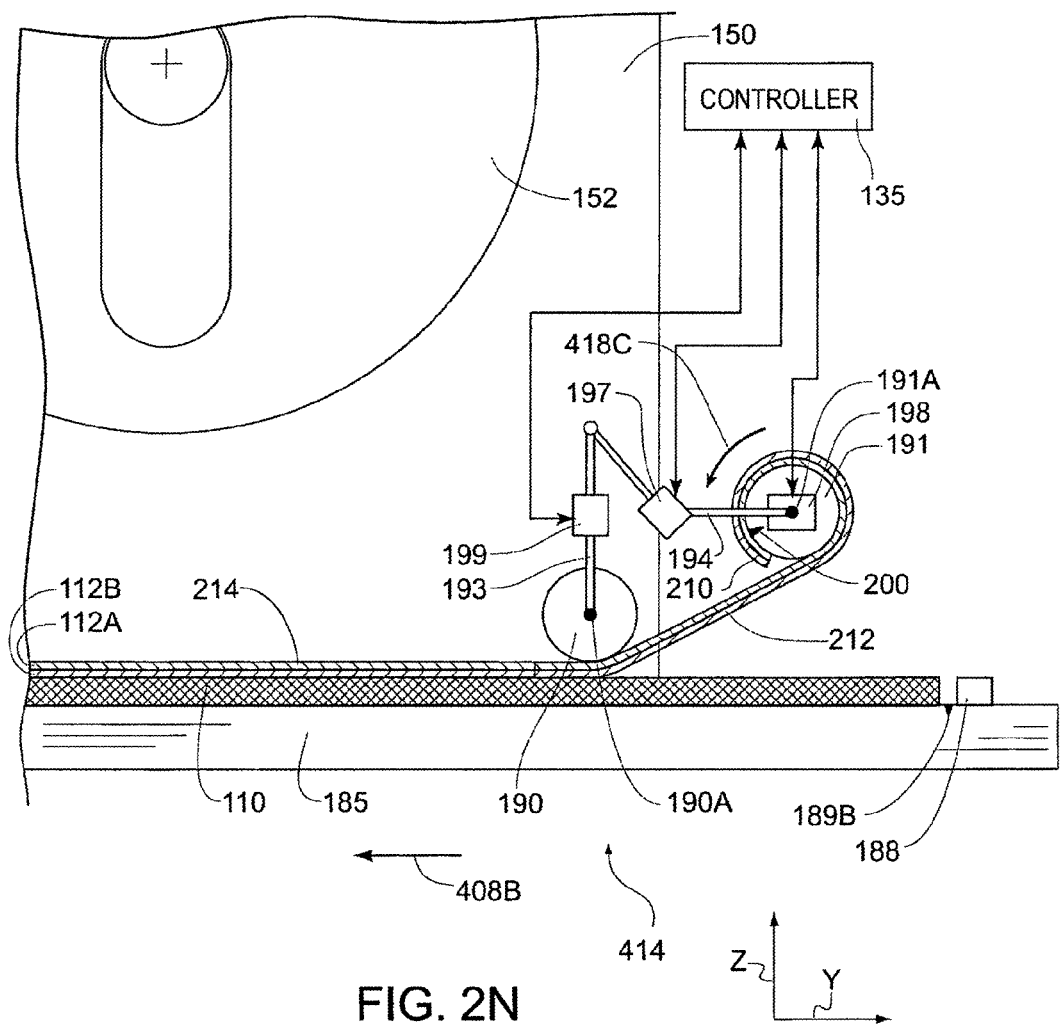
Figure 3:
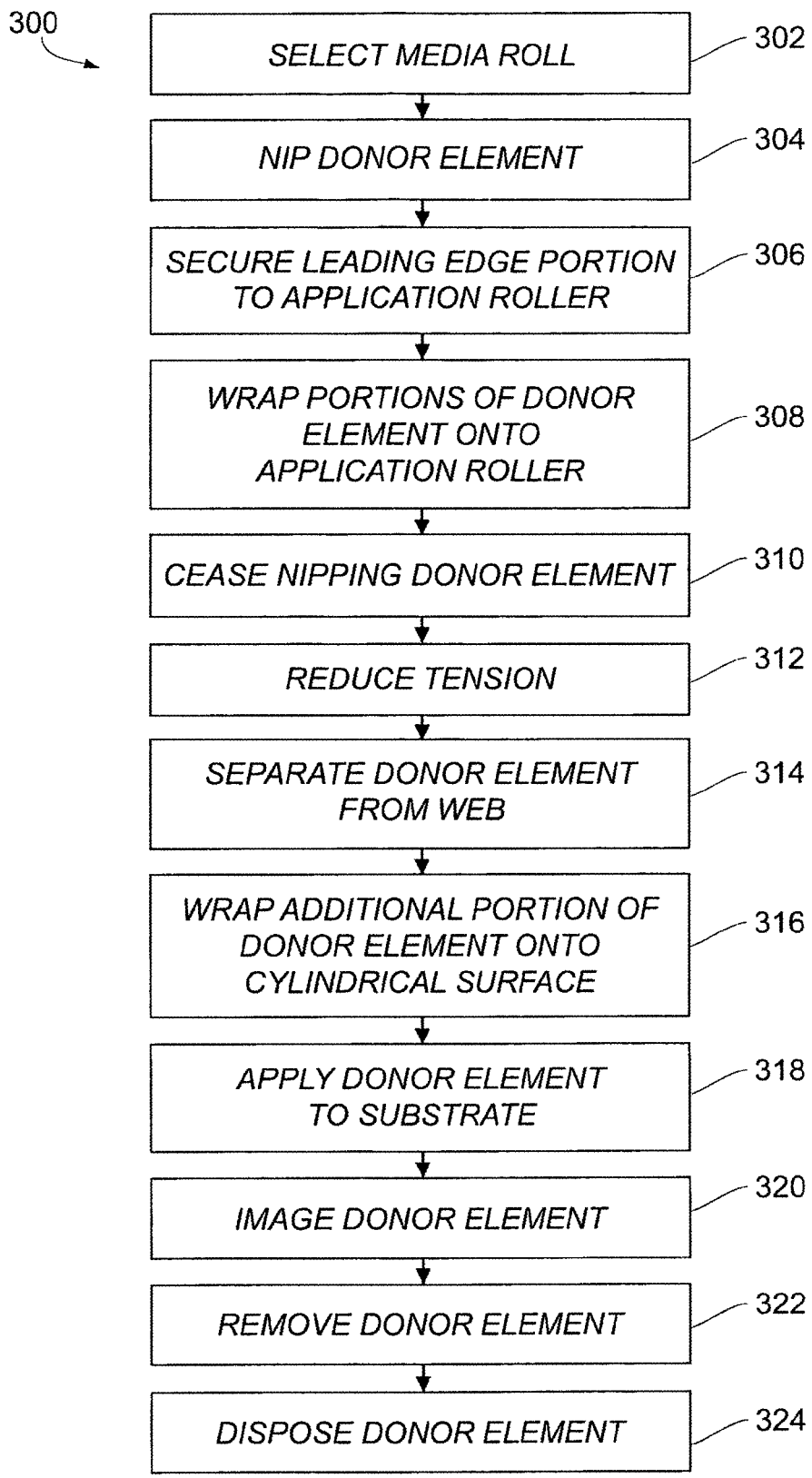
FIG. 3 shows a flow chart representing a method of use of the apparatus of FIG. 2A as per an example embodiment of the invention.

FIG. 3 shows a flow chart representative of a method 300 for handling media, and exposing the media in an exposure process as per an example embodiment of the invention. The various steps illustrated in FIG. 3 are described with reference to apparatus 102 shown in FIGS. 2A, 2B, 2C, 2D, 2E, 2F, 2G, 2H, 2I, 2J, 2K, 2L, 2M and 2N. This is for the purposes of illustration only and other suitable apparatus can be used in the present invention. In step 302, a particular media roll is selected from media supply 120 to dispense a desired donor element therefrom. In this example embodiment, donor element 112 is to be fed from corresponding media roll 113 by media feed system 122 as shown in FIG. 2B. Donor element 112 includes a support layer 112A and a transfer layer 112B.

Various actuators (not shown) are controlled to move media feed system 122 relatively to the media rolls 113, 115 and 117 in accordance with various signals provided by controller 135 that identify a particular donor element that is to be dispensed. In this illustrated embodiment, media feed system 122 includes a movable frame 140 that can be tilted about pivot 141 to various positions proximate to a selected media roll to secure media therefrom. In this example embodiment, each of the media rolls is positioned to be substantially on a common radius 400 originating from pivot 141. In other example embodiments, relative movement between the media feed system 122 and the media rolls can be provided by other mechanisms which can include elevator-type mechanisms, for example.

Frame 140 supports a picking mechanism which includes various rolls including a picking roller 143 and a plurality of nip members which include nip roller 138A and nip roller 138B (i.e. collectively referred to as nip rollers 138) positioned between media roll 113 and application roller 152. At least one of the nip rollers 138 is moveable to selectively nip donor element 112 between nip rollers 138. In other embodiments, there are separate pairs of nip rollers for each media roll.

In this example embodiment of the invention, nip roller 138A is moveable along path 403 to selectively nip donor element 112 against nip roller 138B. As shown in FIG. 2B, nip roller 138A is shown at a spaced-apart location away from nip roller 138B. Picking roller 143 includes suction features 144 which are employed to secure donor element 112 which has been positioned such that a leading edge portion 145 of this media is proximate picking roller 143. Various sensors (not shown) can be used to detect a media edge and controller 135 can cause the media roller 113 to present leading edge portion 145 for picking. Various actuators (not shown) move picking roller 143 relative to frame 140 along a direction of path 405 between the spacing between nip rollers 138. As shown in FIG. 2B, picking roller 143 has moved generally along a direction of path 405 towards media roll 113 so as to position suction features 144 in the vicinity of leading edge portion 145. Once media edge portion 145 is secured by suction features 144, it can be moved away from media roll 113 generally along a direction of path 405.

As shown in FIG. 2C, picking roller 143 has threaded captured leading edge portion 145 through the spacing between nip rollers 138. Once threaded, donor element 112 is nipped by nip rollers 138 in step 304. In this example embodiment, nip roller 138A is operated to move towards nip roller 138B to nip donor element 112 between the nip rollers 138. Suction features 144 are operated to cease applying suction to release leading edge portion 145. In this example embodiment, at least one of the nip rollers 138 is a rotationally driven to retract a portion of donor element 112 back away from picking roller 143 to position leading edge portion 145 in the vicinity of feed gantry 146.

In step 306, the leading edge portion 145 of donor element 112 is secured to application roller 152. Although the application roller 152 is shown as cylindrical, the application roller 152 does not have to form a complete cylinder. In this example embodiment, leading edge portion 145 is handed off to feed gantry 146 which is movable along frame 140. Feed gantry 146 includes suction features 147 which secure leading edge portion 145. Other example embodiments of the invention need not be limited to suction devices for securing media, and can use other gripping or securing devices as are well known in the art. Upon securing leading edge portion 145, feed gantry 146 is moved along frame 140 to handoff leading edge portion 145 to media loader 124. In this example embodiment feed gantry 146 moves along a direction of path 402 to a position in proximity to media loader 124.

Media loader 124 is positioned at a media load position 404 to load donor element 112 thereon. As schematically shown in FIG. 2A, media loader 124 includes carriage 150 which supports various rotatable cylindrical rollers. Carriage 150 is operable for conveying the cylindrical rollers along a path. In this example embodiment of the invention, the cylindrical rollers include application roller 152. Application roller 152 is used to apply appropriately sized media (i.e. donor elements in this example) to a surface of substrate 110 that is supported on imaging support 185 in exposure system 130. Application roller 152 is rotatable about rotation axis 153 which intersects a first end 157 and a second end 159 of the roller. Application roller 152 has a cylindrical surface 158 that is adapted to wrap donor element 112 thereon. In this example embodiment, application roller 152 includes various suction features 154 that are used to secure media such as donor element 112 to cylindrical surface 158. As shown in FIG. 2D, relative movement is provided between application roller 152 and feed gantry 146 to secure leading edge portion 145 with various ones of suction features 154. In this example embodiment, actuators 156 are controlled to move application roller 152 towards and away from feed gantry 146 along path 406. In this example embodiment, path 406 is aligned with the Z axis. In other example embodiments, path 406 can assume other directions. Examples of actuators 156 which may be used to move application roller 152 include suitably coupled electric motors and/or pneumatic actuators. Application roller 152 may be rotated about rotation axis 153 to appropriately orient various ones of suction features 154 for proper engagement with leading edge portion 145.

Once leading edge portion 145 has been secured by suction features 154, application roller 152 moves away from feed gantry 146 along a direction of path 406 and rotates about rotation axis 153 to meter out a desired length of donor element 112. Movement of application roller 152 along path 406 allows feed gantry 146 to be returned to a location proximate to nip rollers 138. A desired length of donor element 112 is metered out as various portions of donor element 112 are wrapped onto cylindrical surface 158 in step 308. In this example embodiment, the various portions of donor element 112 are wrapped onto cylindrical surface 158 by rotating application roller 153 along the direction of arrow 418A as shown in FIG. 2E. In this example embodiment of the invention, nip rollers 138 maintain their nipped engagement with donor element 112 as the various portions of donor element 112 are wrapped onto cylindrical surface 158.

In this example embodiment, application roller 152 and media roll 113 are in the torque mode (i.e. pulling with a specified constant force), pulling on donor element 112 on both sides of the nip rollers 138. The nip rollers 138 are in the position mode (i.e. moving to a specified position at a specified speed/acceleration).

A desired length of donor element 112 that is wrapped onto cylindrical surface 158 can be determined based on various factors. In this example embodiment of the invention, a portion of donor element 112 is to be cut from the media web by cutter 149 after the desired length of donor element 112 is wrapped onto cylindrical surface 158. Cutter 149 is positioned away from application roller 152 by a non-negligible separation distance. This separation distance impacts the amount of donor element 112 that can be wrapped onto cylindrical surface 158 prior to a subsequent separating of donor element 112 to a required length. In this example embodiment, the length of the separated portion of donor element 112 is sized to sufficiently cover substrate 110 during a subsequent exposure step. In this example embodiment, application roller 152 is sized such that the separated portion of donor element 112 substantially covers almost the entirety of the perimeter of the application roller 152 without overlapping itself. Overlapping is typically undesirable since donor element 112 has a non-negligible thickness, and an overlapped edge of donor element 112 can create a step, which can cause a discontinuity or the like to form in the vicinity of a region of such an overlap. The discontinuity can disrupt the uniformity of a transfer layer 112B of donor element 112 during the application of donor element 112 to substrate 110 by application roller 152. Disruptions in the transfer layer 112B can lead to visual artifacts. In this example embodiment, a support layer 112A of donor element 112 is positioned adjacent to cylindrical surface 158 during the wrapping.

FIG. 2F, shows a schematic plan view of part of apparatus 102 during the initial wrapping of donor element 112 onto cylindrical surface 158 in step 308. It is to be noted that some components are not shown for clarity. FIG. 2F shows wrinkles 160 formed in the web of donor element 112 as well as entrapped wrinkles 162 formed on a portion of donor element 112 that has been wrapped around application roller 152. Typically, part of the wrinkles 160 in the web become entrapped wrinkles 162 as the donor element 112 is wrapped around the cylindrical surface 158. Suction applied by suction features 154 or the like may sometimes "smooth-out" very small wrinkles, but this same suction can also trap larger wrinkles as donor element 112 is wrapped onto application roller 152. In this example embodiment, application roller 152 is used to subsequently lay donor element 112 onto a surface for additional processing (i.e. exposure in this case). The visual quality of images formed by exposure processes such as laser-induced thermal transfer are typically sensitive to variances in the spacing between the donor element 112 and substrate 110 onto which it is applied. The inventors have noted that trapped wrinkles such as wrinkles 162 can be transferred at least in part when donor element 112 is applied to substrate 110 and this can detrimentally impact the visual quality of the images that are subsequently formed.

Wrinkles such as wrinkles 160 and entrapped wrinkles 162 can occur for various reasons. For example, misalignment between application roller 152 and media roll 113 and/or nip rollers 138 can lead to the formation of various wrinkles. FIG. 2F shows a case of "in-plane" misalignment between application roller 152 and media roll 113. The term "in-plane" refers to misalignment in the plane of the media web if it were to extend substantially "un-twisted" towards application roller 152. FIG. 2F, shows that if the rotation axis 153 of application roller 152 and the rotation axis 118 of media roll 113 were both intersected by a common axis 450, the misalignment would prevent common axis 450 from being perpendicular to both the rotation axis 153 and the rotation axis 118. In this case media roll 113 is skewed with respect to the orientation of application roller 152. In this case media roll 113 is also skewed with respect to the orientation of nip rollers 138. The skew of media roll 113 can be expressed in the X-Y coordinate frame by an angle $\theta$; referenced from the X axis. Although application roller 152 and nip rollers 138 are not shown skewed with respect to the X-Y coordinate frame, imperfect alignment can cause skewed orientations of these components to also occur. As illustrated herein, orientations of the various rollers and media rolls are referenced with respect to the X axis. This is done for convenience, and it is to be understood that these orientations can be referenced with respect to other directions. For example, the orientation of the various rollers and media rolls can be referenced with respect to a direction of a path that one or more of the rollers are conveyed along. In this illustrated embodiment, application roller 152 can be conveyed along path 408 which is aligned with the Y axis. Angle $\theta$; has been exaggerated for clarity and it is to be noted that even small angles can lead to the problems described herein. For example, the inventors have noted that in some applications, misalignments on the order of a few milli-radians can lead to the formation undesired wrinkling with media webs comprising widths on the order of approximately 2 meters and calipers of approximately two 2 mils (50.8 mm) or less. In other applications, misalignments of greater than 1 or 2 milli-radians are not acceptable and cause undesirable wrinkling. In still other applications, even misalignments of greater than 0.1 milli-radians are not acceptable. Although narrower web widths can be used in attempt to mitigate wrinkling, this approach is unsatisfactory when larger web widths are desired (e.g. when large format color filters such as large screen television color filters are required). Alternatively, the use of longer web lengths between the various media rolls and application roller 152 can be used in attempt to help mitigate wrinkling, but this approach is also unsatisfactory as it can require an undesirable increase in the overall size of apparatus 102.

Misalignments can occur for various reasons. For example, manufacturing and positional tolerances associated with the support structures and mechanisms used to support the various media rolls 113, 115 and 117 can contribute to these misalignments. Additionally, the media assembled on the media rolls 113, 115 and 117 may assume a tapered, barrel, or other irregular form rather than a cylindrical form. Tapered media rolls can arise from variances in the web manufacturing process that create a media roll that varies in diameter from end-to-end. This tapered form may vary from media roll to media roll and can also lead to increased stress variations in the media web. If the web stress is not uniform across the web, the high tension area can damage various coatings (e.g. a transfer layer 112B) or in the extreme, stretch or break the media substrate itself. Low tensioned areas can in turn cause a loss of web tension control which can wrinkle media especially when the media has a light caliper. FIG. 2F schematically shows a resulting non-uniform stress distribution 410 created by the misalignment. This problem is further compounded when multiple media rolls, each potentially having different degrees of misalignment, are processed as would be the case in a typical color filter fabrication process. It is to be noted that the aforementioned wrinkling problems are primarily associated with in-plane misalignment. The inventors have observed that minor amounts of "out-of-plane twisting" of the media web between media roll 113 and application roller 152 typically do not cause unduly large stress risers in the web. Out-of-plane twisting can occur as web twists as it is transferred between a media roll and application roller 152.

It is to be noted that misalignment associated with any, or all of media roll 113, nip rollers 138 and application roller 152 need not be the only factors that can lead to the formation of wrinkles 160 and entrapped wrinkles 162. The present inventors have noted that wrinkles can arise even when very minor amounts of misalignment are present. The present inventors have noted that the amount of wrinkles formed can vary with the caliper of the media that is handled. For example, some current thermal transfer donor elements include support layers that are typically on the order of 2 mils (50.8 mm) and there is a desire to employ thermal transfer donor elements that employ thinner support layers on the order of 1 mil (25.4 mm) or less. Typically, these thinner donor elements are significantly more prone to wrinkling than their thicker counterparts. Further, media handling apparatus of the type of apparatus 102 handle media in a "start-stop" fashion as the movement of each of the various donor elements 112, 114, and 116 is varied as portions of the donor elements are advanced, separated and mounted onto application roller 152. This form of media motion is typically more prone to wrinkling problems than apparatus that employ a continuously moving web of media.

As previously described, it is desired that the levels of wrinkles 160 and 162 be reduced. In step 310, nip roller 138A is moved to cease nipping donor element 112 against nip roller 138B. In this example embodiment of the invention, after initial portions of donor element 112 are wrapped onto cylindrical surface 158, nip roller 138A is operated to move and cease nipping donor element 112. Releasing the nip can help to alleviate non-uniform stresses that are trapped in the vicinity of the nipped web of donor element 112. The present inventors have noted that releasing the nip can help to reduce the occurrence of wrinkles 160 that occur in the donor element 112 web.

During step 308, various portions of the donor element 112 including a first portion 164 and a second portion 166 were wrapped around cylindrical surface 158 under an applied tension to conform the portions to cylindrical surface 158. Various regions of contact are established between each of these portions and cylindrical surface 158. In particular, FIG. 2E shows that a region of contact 169 between a first portion 164 and cylindrical surface 158 is established under the applied tension. Wrinkles such as entrapped wrinkles 162 are typically entrapped within the region of contact 169. In step 312, the tension applied to the portions of donor element 112 that are wrapped onto cylindrical surface 158 is reduced. In this example embodiment, the applied tension is reduced to levels sufficient to reduce the presence of entrapped wrinkles 162 to acceptable levels for a subsequent exposure of donor element 112.

In this example embodiment of the invention, the reduction in the applied tension alters region of contact 169. In this example embodiment, the reduction in the applied tension allows for reduction in the size of the region of contact 169 as one or more of the wrapped portions separate by varying degrees from cylindrical surface 158. In FIG. 2G, the tension applied to donor element 112 is reduced to levels sufficient to cause second portion 166 to separate from cylindrical surface 158 such that second portion 166 no longer conforms to cylindrical surface 158. The tension applied to donor element 112 is reduced to levels sufficient to cause first portion 164 to separate slightly from cylindrical surface 158. It is to be noted that the separation of first portion 164 from cylindrical surface 158 has been exaggerated for clarity. Reduction in the applied tension reduces the radial forces applied by the wrapped portions of donor element 112 against cylindrical surface 158 which in turn reduce levels of contact.

Although the present inventors do not wish to be bound by a particular theory, one possible reason for the reduction in entrapped wrinkles 162 that accompany this action is that even slight separations between the various wrapped portions and the cylindrical surface 158 can allow for air to permeate therebetween to reduce the region of contact 169 and smooth out the wrinkles. As shown in FIG. 2G, first portion 164 still substantially maintains its conformed shape, even though parts of it may be slightly separated from cylindrical surface 158 under the action of the reduced tension.

The tension applied to donor element 112 can be reduced in various ways. In some example embodiments of the invention, the applied tension can be reduced by operating nip rollers 138 and media roll 113 to create slack in the media between nip rollers 138 and application roller 152. For example, application roller 152 can be controlled to remain stationary while media roll 113 and the nip rollers 138 are driven to create the slack. Alternatively, the adoption of relative movement between application roller 152 and the nip rollers 138 can be used to establish slack in the media between the two. For example, carriage 150 can be controlled to move application roller 152 towards nip rollers 138 to reduce the tension in donor element 112.

In the example embodiment of the invention illustrated in FIG. 2G, the tension applied to donor element 112 is reduced while rotating application roller 152 about rotation axis 153. In this example embodiment, application roller 152 is rotated along the rotational direction of arrow 418B which is opposite to rotational direction of arrow 418A. Rotation of application roller 152 causes second portion 166 to unwrap from cylindrical surface 158 and separate from application roller 152. FIG. 2G shows that second portion 166 no longer conforms to cylindrical surface 158 but forms part of the slack in donor element 112. In other embodiments of the invention, application roller 152 can undergo other forms of movement to alter the applied tension in donor element 112. Other forms of movement can include a translational movement of rotation axis 153. In this example embodiment of the invention, actuator 156 is operated to translate application roller 152 along a direction of path 406. As shown in FIG. 2G, application roller 152 is moved downward in this example embodiment. The translational movement of application roller 152 can be employed to help trap air between donor element 112 and the cylindrical surface 158. Portions of the entrapped air can in turn cause slight separations of various portions of donor element 112 that are still wrapped onto cylindrical surface 158 and smooth out remaining entrapped wrinkles 162. The smoothing out of entrapped wrinkles 162 will typically be dependant on the thickness of donor element 112 as well as machine parameters such as the amount and/or speed of the rotational movement and the amount and/or speed of the translational movement. Suitable machine parameters can be determined in various ways including by direct experimentation. It is important to establish the correct amount of slack in the donor element 112 when the tension is released. Proper slack allows donor element 112 to establish a smoothly curved and non-wrinkled form in regions proximate to feed gantry 146. This non-wrinkled form can be preserved when the donor element 112 is attached to the feed gantry 146 to reduce wrinkles in the trailing end of the donor element 112 while the donor element is wrapped onto the application roller 152.

In step 314, a portion of donor element 112 is separated from the web. In the illustrated embodiment of the invention shown in FIG. 2H, donor element 112 is separated by cutter 149. Cutter 149 can employ various cutting mechanisms as are well known in the art. Lasers are especially well suited for the typical clean room environments employed in the fabrication of color filters since reduced levels of cutting debris are generated in laser cutting. In this example embodiment of the invention, cutter 149 separates donor element 112 after feed gantry 146 has moved back and has secured donor element 112 in a region proximate to cutter 149. A trailing edge portion 148 is formed on donor element 112 by the cutting action. Those skilled in the art will appreciate that other methods can be employed to separate portions of donor element 112 from the web.

In step 316, an additional or third portion 168 of donor element 112 is wrapped onto cylindrical surface 158. In this example embodiment, the third portion 168 includes second portion 166. In this example embodiment, second portion 166 was previously unwrapped from application roller 152. In this example embodiment, third portion 168 is larger in size than second portion 166. In this example embodiment, third portion 168 includes trailing edge portion 148.

In this example embodiment, third portion 168 is wrapped onto cylindrical surface 158 by first removing the slack in donor element 112. In this example embodiment, feed gantry 146 is operated to maintain secured trailing edge portion 148 substantially stationary while application roller 152 is rotated in the direction of arrow 418A to remove the slack in donor element 112. Rotational speed of application roller 152 is maintained at levels sufficient to uniformly wrap portions of donor element 112 corresponding to the slack. The present inventors have discovered that the limited tension created as the slack is taken up leads to significant reductions in entrapped wrinkles 162 both in first portion 164 and in the wrapped parts of third portion 168 as these portions are conformed to cylindrical surface 158.

Once the slack is taken up, remaining parts of third portion 168 are wrapped onto cylindrical surface 158 by operating feed gantry 146 to move towards application roller 152. In this example embodiment, feed gantry 146 applies controlled tension as the unwrapped remainder of third portion 168 is applied to application roller 152. Since nip rollers 138 no longer nip donor element 112, non-uniform stresses are reduced in donor element 112 and the remaining parts of third portion 168 are wrapped onto cylindrical surface 158 with reduced occurrences of entrapped wrinkles 162. The various guide members and drives (not shown) that control the movement of feed gantry 146 along path 402 preferably are adapted to allow feed gantry 146 to pivot and freely move side-to-side as it is moved towards application roller 152. For example, compliance members, such as various flexures, biasing elements, springs, or other means know in the art can be provided to allow feed gantry 146 to pivot and freely move from side to side. The ability of feed gantry 146 to pivot can be used to overcome non-uniform stresses in donor element 112 that can arise when misalignment between feed gantry 146 and application roller 152 exists. It is to be noted that the size of region of contact 169 between first portion 164 and cylindrical surface 158 increases as various parts of third portion 168 conform to cylindrical surface 158 under these wrapping actions. Various regions of contact that are substantially free of entrapped wrinkles 162 can be established between donor element 112 and cylindrical surface 158 when non-uniform stresses in donor element 112 are reduced by the practice of various embodiments of the present invention. In this light, the use of the media application techniques of the present invention advantageously results in a substantially uniform application of donor element 112 to cylindrical surface 158 with a significant reduction in entrapped wrinkles 162.

Upon completing the wrapping of third portion 168 onto cylindrical surface 158, trailing edge portion 148 is released from feed gantry 146 and is secured by various ones of suction features 154 as shown in FIG. 2I. In this example embodiment, application roller is moved along a direction of path 406 away from frame 140. In this example embodiment, media roll 113 is rotated to retract any extending portions of the donor element 12 web and picking roller 143 is repositioned for a subsequent picking action of another donor element.

After donor element 112 has been wrapped onto application roller 152 in substantially uniform and wrinkle-free manner, application roller 152 is conveyed to exposure system 130. In this example embodiment, carriage 150 is employed to convey application roller 152 along with the portion of donor element 112 mounted onto application roller 152. As shown in FIG. 2A, carriage 150 is movable along guides 174 to various positions required by the various functions of media loader 124. One or more drives 170 can be employed to move carriage 150 along guides 174. Suitable drives can include various motors including servo motors and stepper motors and can include transmission members that can include suitable belts, screws, rack and pinions, and the like. A suitable drive is described in WO 2009/127888, filed on Apr. 14, 2008, the disclosure of which is incorporated by reference hereby. In this example embodiment of the invention, carriage 150 is movable along a path 408 substantially aligned with the Y axis. Carriage 150 is movable along away direction 408A and along home direction 408B along path 408.

In step 318, mounted donor element 112 is applied by application roller 152 onto a surface of substrate 110 which is in turn supported by imaging support 185. Exposure system 130 includes at least one exposure head 136 which can move relative to imaging support 185. In this example embodiment of the invention, exposure head 136 is movably supported on bridge support 187 which spans over imaging support 185. Exposure head 136 is controlled by controller 135 to move along bridge support 187. Various motion systems (not shown) are used to provide relative movement between exposure head 136 and imaging support 185. These motion systems can include any suitable drives, transmission members, and/or guide members needed for the required movement. In this example embodiment of the invention, the motion systems are controlled by controller 135 to move imaging support 185 along a path aligned with the Y axis while moving exposure head 136 along a path aligned with the X axis. Those skilled in the art will realize that other forms of movement are also possible. For example, exposure head 136 can be stationary while imaging support 185 is moved. In other example embodiments, imaging support 185 is stationary and exposure head 136 is moved. One or both of exposure head 136 and imaging support 185 can reciprocate along corresponding paths. Separate motion systems can also be used to operate different systems within exposure system 130.

Exposure head 136 can include a radiation source (not shown), such as a laser. Exposure head 136 can be controlled to direct one or more radiation beams (not shown) capable of forming an image on media. The imaging beams generated by exposure head 136 are scanned over the media while being image-wise modulated according to image data 137 specifying the image to be written. One or more imaging channels of exposure head 136 (not shown) are driven to produce radiation beams with active intensity levels wherever it is desired to form an image portion. Imaging channels not corresponding to the image portions are driven so as not to image corresponding areas. Exposure head 136 can include a plurality of imaging channels that can be arranged in an array. An array of imaging channels can include a one dimensional or a two dimensional array. A radiation beam can undergo a direct path from a radiation source to the media or can be deflected by one or more optical elements towards the media.

FIG. 2J schematically shows the application of mounted donor element 112 onto substrate 110 by application roller 152 as per an example embodiment of the invention. Carriage 150 is moved along away direction 408A into proximity of substrate 110 at media application position 417. Application roller 152 is positioned such that an edge portion of donor element 112 is in proximity to suction features 189A in imaging support 185. In this example embodiment, actuators 156 are controlled to move application roller 152 towards imaging support 185 along a direction of path 406. Various suction features 154 in application roller 152 are disabled while suction features 189A are enabled during the application of the edge portion of donor element 112 to substrate 110. Remaining portions of donor element 112 are applied to substrate 110 by moving carriage 150 along an application direction (i.e. along guides 174) while rotating application roller 152 to roll these portions onto substrate 110. In this illustrated embodiment, carriage 150 is moved along away direction 408A.

FIG. 2K schematically depicts a cross-sectional view of donor element 112 after its application to substrate 110. In FIG. 2K, substrate 110 is secured to imaging support 185. As is known in the art, there are a variety of techniques for securing substrate 110 to imaging support 185. In this illustrated embodiment, donor element 112 is applied atop substrate 110 such that transfer layer 112B is adjacent to substrate 110. To preserve image quality, it is desirable that donor element 112 be prevented from moving with respect to substrate 110 during imaging. In the illustrated embodiment, imaging support 185 comprises stands 188 which are transversely spaced apart from the edges of substrate 110 and which have heights that are substantially similar to the thickness of substrate 110. Suction features 189A and 189B selectively apply suction in spaces 173 between stands 188 and substrate 110. This suction secures donor element 112 to substrate 110. It will be appreciated by those skilled in the art that there are other additional and/or alternative techniques for securing donor element 112 to substrate 110 and the invention should be understood to accommodate such additional and/or alternative donor element securing techniques.

Once donor element 112 has been applied to substrate 110, the media is exposed or imaged by exposure head 136 in step 320. Images can be formed on media by different methods. For example, the media can include an image modifiable surface, wherein a property or characteristic of the modifiable surface is changed when irradiated by a radiation beam to form an image. A radiation beam can be used to ablate a surface of the media to form an image. In this illustrated embodiment of the invention, a laser-induced thermal transfer process is employed. In particular, radiation beams emitted by exposure head 136 are scanned across support layer 112A to cause donor material from transfer layer 112B to be transferred to substrate 110 in a laser-induced thermal transfer process.

The transfer of donor material (not shown) from donor element 112 to substrate 110 may be implemented using a variety of laser-induced thermal transfer techniques which can include by way of example: laser-induced "dye transfer" processes, laser-induced "melt transfer" processes, laser-induced "ablation transfer" processes, and laser-induced "mass transfer" processes.

In general, the make-up of substrate 110, support layer 112A, and the transfer layer 112B depend on the particular imaging application. In particular embodiments, exposure system 130 is used to fabricate color filters for displays on substrate 110. In such embodiments, substrate 110 is typically made of a transparent material (e.g. glass), support layer 112A is typically made of plastic and transfer layer 112B typically comprises one or more colorants. Such colorants may include suitable dye-based or pigment-based compositions, for example. Transfer layer 112B may also comprise one or more suitable binder materials.

Once exposed, donor element 112 is spent and is removed from a surface of substrate 110 in step 322. Removal of donor element 112 can be required for various reasons including, but not limited to, the preparation of substrate 110 for the application and exposing of other media (e.g. donor elements 114 and 116). Spent donor element 112 can be removed from substrate 110 by various techniques. Some of these removal techniques can include peeling donor element 112 from substrate 110. In this illustrated embodiment of the invention, carriage 150 includes various cylindrical rollers which are employed to remove spent donor element 112 from substrate 110. In this illustrated embodiment of the invention, these various cylindrical rollers include a peel roller 190 and a take-up roller 191.

Each of peel roller 190 and take-up roller 191 includes first and second ends that are intersected by a corresponding rotation axis and each roller further includes a surface adapted to wrap media over a portion thereof. Peel roller 190 and a take-up roller 191 are respectively mechanically coupled to carriage 150 by a corresponding pair of roller couplings (peel roller coupling 193 and take-up roller coupling 194). Peel roller coupling 193 and take-up roller coupling 194 permit their respective rollers 190, 191 to rotate about their corresponding rotation axes 190A, 191A. As illustrated, take-up roller coupling 194 comprises an actuator 197 which effects movement of the rotation axis 191A of take-up roller 191 with respect to carriage 150. Actuator 197 is referred to herein as the "take-up roller axis-position actuator 197". Peel roller coupling 193 comprises an actuator 199 which effects movement of the rotation axis 190A of peel roller 190 with respect to carriage 150. Actuator 199 is referred to herein as the "peel roller axis-position actuator 199". Peel roller axis-position actuator 199 and take-up roller axis-position actuator 197 may be controlled by controller 135 using various signals and can each include any suitably coupled actuator(s). Examples of actuators which may be used to provide take-up roller axis-position actuator 197 and peel roller axis-position actuator 199 include suitably coupled electric motors and/or pneumatic actuators.

As illustrated, take-up roller coupling 194 also comprises a take-up roller rotational actuator 198 which causes rotation of take-up roller 191 about its rotation axis 191A. Take-up roller rotational actuator 198 may be controlled by controller 135 using various signals. Preferably, take-up roller rotational actuator 198 comprises a suitably coupled motor, but take-up roller rotational actuator 198 may generally comprise any suitably configured actuator. Suction features 200 are provided to assist in the removal of the donor element 112. In the illustrated embodiment, peel roller 190 is a non-driven "idler" roller. In alternative embodiments, peel roller 190 may be rotationally driven.

When it is desired to remove donor element 112 from substrate 110, controller 135 controls drives 170 to create relative movement between carriage 150 and imaging support 185, such that carriage 150 is positioned at a media removal position 414 in the vicinity of an edge portion 210 of donor element 112. FIG. 2L shows that peel roller axis-position actuators 199 were controlled to move peel roller 190 along a direction that has at least a component parallel to the Z axis. Peel roller 190 moves toward donor element 112 until it makes contact with donor element 112. Preferably, peel roller 190 contacts donor element 112 in a non-imaged region 212 (i.e. outside of an imaged region 214). This positioning of the contact between peel roller 190 and donor sheet 112 avoids an impact of peel roller 190 in imaged region 214 and prevents any corresponding degradation of the image in imaged region 214.

As shown in FIG. 2L, controller 135 also uses various signals to cause take-up roller axis-position actuator 197 to move take-up roller 191 into the vicinity of donor element 112. Preferably, take-up roller 191 moves into the vicinity of non-imaged region 212 of donor element 112 at a location that is further from imaged region 214 than the location of peel roller 190. In some example embodiments, as shown in FIG. 2L, take-up roller 191 moves into the vicinity of portion 215 of non-imaged region 212. In some embodiments, take-up roller 191 moves into the vicinity of portion 215 at a location which at least partially overlies stand 188. In some embodiments, take-up roller 191 moves into the vicinity of non-imaged region 212 at a location that is spaced further from the edge of substrate 110 than the suction features which secure donor sheet 112 to substrate 110 (i.e. suction features 189B in this example). Take-up roller 191 makes contact with donor element 112 and causes a portion of non-imaged region 212 to adhere to take-up roller 191.

FIG. 2M shows that once portion 215 of donor element 112 is secured to the cylindrical surface of take-up roller 191, controller 135 causes take-up roller axis-position actuator 197 to move take-up roller 191 away from substrate 110 (i.e. in a direction that has at least a component in parallel to the Z axis). As can be seen by comparing FIGS. 2M and 2L, take-up roller axis-position actuator 197 causes movement of take-up roller 191 with respect to carriage 150 and with respect to peel roller 190 while carriage 150 and peel roller 190 remain in the same positions. Portion 215 of donor element 112 and possibly other portions of donor element 112 move away from imaging support 185 when take-up roller 191 moves in this manner.

As shown in FIG. 2M, peel roller 190 preferably remains in contact with, and may exert force against, donor element 112. Consequently, a portion of donor element 112 on one side of peel roller 190 remains in contact with substrate 110 while, another portion of donor element 112 peels away from substrate 110 and partially wraps around the circumferential surface of peel roller 190.

As carriage 150 is translated along home direction 408B and as take-up roller 191 rotates in the direction of arrow 418C, donor element 112 is "taken up" by (i.e. winds around the cylindrical surface of) take-up roller 191 as shown in FIG. 2N. Peel roller 190 remains in contact with the portion of donor element 112 which is still on substrate 110 and may apply a force against donor element 112.

The simultaneous rotation and translation of both peel roller 190 and take-up roller 191 during the sheet peeling process prevents a "print-through" effect. Print-through effects can arise when a media is wrapped around a roller as the roller is translated to peel the media. Since the media edge can have a non-negligible thickness, the edge of the media that is initially secured to the roller can cause a portion of the unpeeled media to exhibit a discontinuity when the secured edge is rolled over it. In this illustrated embodiment, since take-up roller 191 is spaced-apart from substrate 110, the imaged region 214 is unaffected since edge portion 210 is wrapped around take-up roller 191 and does not directly roll over imaged portion 214. The change in thickness caused by the edge of edge portion 210 of donor element 112 therefore does not impact the image imparted onto substrate 110. In some example embodiments of the invention, artifacts such as print-through artifacts are not prevalent and additional rollers such as take-up roller 191 are not employed. In some example embodiments, media is removed by continuously wrapping itself around a roller that is rolled across the media during the removal process.

Once spent donor element 112 has been peeled from substrate 110 and has been spooled onto take-up roller 191, carriage 150 is moved towards disposal system 126 to dispose donor element 112 in step 324. In this example embodiment, take-up roller rotational actuator 198 is controlled to unwind donor element 112 from take-up roller 191 to dispose of spent donor element 112 into disposal system 126. Additional donor elements such as donor elements 114 and donor elements 116 can be processed in a similar manner.

Various embodiments of the invention have been described in terms of manufacturing color filters for various displays. In some example embodiments of the invention, the displays can be LCD displays. In other example embodiments of the inventions, the displays can be organic light-emitting diode (OLED) displays. OLED displays can include different configurations. For example, in a fashion similar to LCD display, different color features can be formed into a color filter used in conjunction with a white OLED source. Alternatively, different color illumination sources in the display can be formed with different OLED materials in various embodiments of the invention. In these embodiments, the OLED based illumination sources themselves control the emission of colored light without necessarily requiring a passive color filter. OLED materials can be transferred to suitable media. OLED materials can be transferred to a receiver element with laser-induced thermal transfer techniques.

While the invention has been described using as examples applications in display and electronic device fabrication, the methods described herein are directly applicable to other applications including those used in biomedical imaging for lab-on-a-chip (LOC) fabrication. The invention can have application to other technologies, such as medical, printing and electronic fabrication technologies, or any other technology which uses webs.

As will be apparent to those skilled in the art in light of the foregoing disclosure, many alterations and modifications are possible in the practice of this invention without departing from the spirit or scope thereof.

PARTS LIST

- 10 substrate
- 12 donor element
- 12A support layer
- 12B transfer layer
- 14 lasers
- 16 laser beams
- 102 apparatus
- 103 support
- 110 substrate
- 112 donor element
- 112A support layer
- 112B transfer layer
- 113 media roll
- 114 donor element
- 115 media roll
- 116 donor element
- 117 media roll
- 118 rotation axis
- 120 media supply
- 122 media feed system
- 124 media apply/peel system (media loader)
- 126 disposal system
- 130 exposure system
- 135 controller
- 136 exposure head
- 137 image data
- 138 nip rollers
- 138A nip roller
- 138B nip roller
- 140 frame
- 141 pivot
- 143 picking roller
- 144 suction features
- 145 leading edge portion
- 146 feed gantry
- 147 suction features
- 148 trailing edge portion
- 149 cutter
- 150 carriage
- 152 application roller
- 153 rotation axis
- 154 suction features
- 156 actuators
- 157 first end
- 158 cylindrical surface
- 159 second end
- 160 wrinkles
- 162 entrapped wrinkles
- 164 first portion
- 166 second portion
- 168 third portion
- 169 region of contact
- 170 drives
- 173 spaces
- 174 guides
- 185 imaging support
- 187 bridge support
- 188 stands
- 189A suction features
- 189B suction features
- 190 peel roller
- 190A rotation axis
- 191 take-up roller
- 191A rotation axis
- 193 peel roller coupling
- 194 take-up roller coupling
- 197 take-up roller position-axis actuator
- 198 take-up roller rotational axis actuator
- 199 peel roller position-axis actuator
- 200 suction features
- 210 edge portion
- 212 non-imaged region
- 214 imaged region
- 215 portion
- 300 method
- 302 select media roll
- 304 nip donor element
- 306 secure leading edge portion to application roller
- 308 wrap portions of donor element onto application roller
- 310 cease nipping donor element
- 312 reduce tension
- 314 separate donor element from web
- 316 wrap additional portion of donor element onto cylindrical surface
- 318 apply donor element to substrate
- 320 image donor element
- 322 remove donor element
- 324 dispose donor element
- 400 radius
- 402 path
- 403 path
- 404 media load position
- 405 path
- 406 path
- 408 path
- 408A away direction
- 408B home direction
- 410 non-uniform stress distribution
- 414 media removal position
- 418A arrow
- 418B arrow
- 418C arrow
- 417 media application position
- 450 common axis
- θ angle

What is claimed is:

1. A method for using a donor element in a radiation-induced thermal transfer process, wherein the donor element comprises a support layer and a transfer layer, the method comprising:
providing a rotatable roller comprising a cylindrical surface adapted to wrap the donor element thereon;
securing a first end of the donor element to the roller;
wrapping a first portion of the donor element onto the cylindrical surface while applying tension to the media to establish a region of contact between the first portion of the donor element and the cylindrical surface;

decreasing the applied tension to alter the region of contact between the first portion of the donor element and the cylindrical surface;

wrapping an additional portion of the donor element onto the cylindrical surface after the region of contact between the first portion of the donor element and the cylindrical surface has been altered;

transferring the donor element from the roller to a substrate, and image-wise exposing the donor element to radiation to transfer a portion of the transfer layer from the donor element to the substrate.

2. A method according to claim 1, comprising unwrapping a second portion of the donor element from the cylindrical surface before wrapping the additional portion of the donor element onto the cylindrical surface.

3. A method according to claim 1, comprising unwrapping a second portion of the donor element from the cylindrical surface while decreasing the applied tension.

4. A method according to claim 1, comprising rotating the roller about a rotation axis of the roller to unwind a second portion of the donor element from the cylindrical surface to decrease the applied tension.

5. A method according to claim 1, comprising translating a rotation axis of the roller while separating part of the first portion of the donor element from the cylindrical surface.

6. A method according to claim 4, comprising translating the rotation axis of the roller while separating part of the first portion of the donor element from the cylindrical surface.

7. A method according to claim 1, comprising increasing a size of the region of contact while wrapping the additional portion of the donor element onto the cylindrical surface.

8. A method according to claim 2, wherein the additional portion of the donor element includes the second portion of the donor element.

9. A method according to claim 8, wherein the additional portion of the donor element is greater in size than the second portion of the donor element.

10. A method according to claim 1, comprising operating at least one nip member to nip the donor element while wrapping the first portion of the donor element onto the cylindrical surface, and operating the at least one nip member to cease nipping the donor element prior to decreasing the applied tension.

11. A method according to claim 2, comprising operating at least one nip member to nip the donor element while wrapping the first portion of the donor element onto the cylindrical surface, and operating the at least one nip member to cease nipping the donor element while unwrapping the second portion of the donor element from the cylindrical surface.

12. A method according to claim 1, wherein the donor element is assembled on a donor element roll, and the method comprises extending the donor element between the donor element roll and the roller.

13. A method according to claim 12, comprising providing at least one nip member adapted to selectively nip the donor element, wherein the at least one nip member is positioned to nip the donor element at a location between the donor element roll and the roller.

14. A method according to claim 12, comprising separating a portion of the donor element from the donor element assembled on the donor element roll.

15. A method according to claim 14, wherein the separated portion of the donor element is sized to wrap over the surface of the roller without overlapping itself.

16. A method according to claim 1, wherein transferring the donor element from the roller to the substrate includes establishing relative movement between the roller and the substrate.

17. A method according to claim 1, wherein transferring the donor element from the roller to the substrate includes moving a rotation axis of the roller relative to the substrate.

18. A method according to claim 1, wherein transferring the donor element from the roller to the substrate includes rolling the roller over the substrate.

19. A method according to claim 1, comprising operating a carriage to convey the roller along a path after the additional portion of the donor element has been wrapped onto the cylindrical surface.

20. A method according to claim 1, wherein the support layer is disposed adjacent to the cylindrical surface when the first portion of the donor element is wrapped onto the cylindrical surface.

21. A method according to claim 1, wherein a thickness of the support layer is 2 mils (50.8 mm) or less.

22. A method according to claim 1, wherein a thickness of the support layer is 1 mil (25.4 mm) or less.

23. A method for applying media to a roller, comprising:
providing a rotatable roller comprising a cylindrical surface adapted to wrap the media thereon;
providing at least one nip member adapted to selectively nip the media;
securing a first end of the media to the roller while operating the at least one nip member to nip the media;
wrapping a first portion of the media onto the cylindrical surface while operating the at least one nip member to nip the media;
unwrapping a second portion of the media from the cylindrical surface while operating the at least one nip member to not nip the media;
wrapping a third portion of the media onto the cylindrical surface after the second portion of the media is unwrapped from the cylindrical surface, wherein the third portion of the media comprises at least the second portion of the media;
wherein the media is assembled on a media roll, and the method comprises extending the media between the media roll and the roller;
comprising separating a portion of the media from the media assembled on the media roll; and
wherein the portion of the media is sized to wrap over the surface of the roller without overlapping itself.

24. A method for applying media to a roller, comprising:
providing a rotatable roller comprising a cylindrical surface adapted to wrap the media thereon;
providing at least one nip member adapted to selectively nip the media;
securing a first end of the media to the roller while operating the at least one nip member to nip the media;
wrapping a first portion of the media onto the cylindrical surface while operating the at least one nip member to nip the media;
unwrapping a second portion of the media from the cylindrical surface while operating the at least one nip member to not nip the media;
wrapping a third portion of the media onto the cylindrical surface after the second portion of the media is unwrapped from the cylindrical surface, wherein the third portion of the media comprises at least the second portion of the media;

comprising rotating the roller about a rotation axis of the roller while wrapping at least one of the first portion of the media and the third portion of the media onto the cylindrical surface;

comprising rotating the roller about the rotation axis while unwrapping the second portion of the media from the cylindrical surface; and comprising translating the rotation axis of the roller while unwrapping the second portion of the media from the cylindrical surface.

25. A method for applying media to a roller, comprising:

providing a rotatable roller comprising a cylindrical surface adapted to wrap the media thereon;

providing at least one nip member adapted to selectively nip the media;

securing a first end of the media to the roller while operating the at least one nip member to nip the media;

wrapping a first portion of the media onto the cylindrical surface while operating the at least one nip member to nip the media;

unwrapping a second portion of the media from the cylindrical surface while operating the at least one nip member to not nip the media;

wrapping a third portion of the media onto the cylindrical surface after the second portion of the media is unwrapped from the cylindrical surface, wherein the third portion of the media comprises at least the second portion of the media;

comprising decreasing a tension applied to a portion of the media wrapped onto the cylindrical surface of the media before wrapping an additional portion of the media onto the cylindrical surface;

comprising rotating the roller about a rotation axis of the roller to decrease the applied tension; and comprising translating the rotation axis of the roller to introduce air between the portion of the media and the cylindrical surface.

26. A method for applying media to a roller, comprising:

providing a rotatable roller comprising a cylindrical surface adapted to wrap the media thereon;

providing at least one nip member adapted to selectively nip the media;

securing a first end of the media to the roller while operating the at least one nip member to nip the media;

wrapping a first portion of the media onto the cylindrical surface while operating the at least one nip member to nip the media;

unwrapping a second portion of the media from the cylindrical surface while operating the at least one nip member to not nip the media;

wrapping a third portion of the media onto the cylindrical surface after the second portion of the media is unwrapped from the cylindrical surface, wherein the third portion of the media comprises at least the second portion of the media; and comprising conveying the roller along a path after the third portion of the media has been wrapped onto the cylindrical surface.

27. A method for applying media to a roller, comprising:

providing a rotatable roller comprising a cylindrical surface adapted to wrap the media thereon;

providing at least one nip member adapted to selectively nip the media;

securing a first end of the media to the roller while operating the at least one nip member to nip the media;

wrapping a first portion of the media onto the cylindrical surface while operating the at least one nip member to nip the media;

unwrapping a second portion of the media from the cylindrical surface while operating the at least one nip member to not nip the media;

wrapping a third portion of the media onto the cylindrical surface after the second portion of the media is unwrapped from the cylindrical surface, wherein the third portion of the media comprises at least the second portion of the media; and wherein the media is a donor element comprising a support layer and a transfer layer, and the method comprises image-wise transferring a portion of the transfer layer from the donor element to a substrate.

28. A method according to claim 27, wherein the support layer comprises a thickness that is 2 mils (50.8 mm), or less.

29. A method according to claim 27, wherein the support layer comprises a thickness that is 1 mil (25.4 mm) or less.

30. Apparatus for using a donor element in a thermal-transfer process, wherein the donor element includes a support layer and a transfer layer, the apparatus comprising:

a support;

a media roll upon which the donor element is assembled;

a rotatable roller comprising a cylindrical surface adapted to wrap the donor media thereon;

a carriage moveably mounted on the support and operable for conveying the roller along a path; and a controller programmed for:

causing the roller to rotate to wrap a first portion of the donor element onto the cylindrical surface while applying tension to the donor element to establish a region of contact between the first portion of the donor element and the cylindrical surface;

causing the roller to rotate while decreasing the applied tension to alter the region of contact between the first portion of the donor element and the cylindrical surface;

causing the roller to rotate to wrap an additional portion of the donor element onto the cylindrical surface after the region of contact between the first portion of the donor element and the cylindrical surface has been altered; and operating the carriage to move the roller along the path while transferring the first portion of the donor element and the additional portion of the donor element from the cylindrical surface to a substrate.

31. Apparatus according to claim 30, wherein the controller is programmed to cause the roller to translate while decreasing the applied tension.

32. Apparatus according to claim 30, comprising at least one nip member adapted to selectively nip the donor element at a location between the media roll and the roller.

33. Apparatus according to claim 30, comprising a cutter adapted to separate the donor element at a location between the media roll and the roller.

34. Apparatus according to claim 30, comprising an exposure head adapted to image-wise expose the donor element to transfer a portion of the transfer layer to the substrate.

* * * * *